(12) United States Patent
Won et al.

(10) Patent No.: US 10,942,995 B2
(45) Date of Patent: Mar. 9, 2021

(54) METHOD FOR OBTAINING BIOMETRIC INFORMATION USING LIGHT SOURCE CORRESPONDING TO BIOMETRIC INFORMATION AND ELECTRONIC DEVICE THEREOF

(71) Applicant: SAMSUNG ELECTRONICS CO., LTD., Suwon-si (KR)

(72) Inventors: Jin-Hee Won, Ansan-si (KR); Jung-Mo Kim, Yongin-si (KR); Jaehyuck Park, Suwon-si (KR); Younghoon Jung, Suwon-si (KR); Daehyeong Lim, Anyang-si (KR); Jeong-Min Park, Hwaseong-si (KR); Seung-Eun Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 273 days.

(21) Appl. No.: 16/108,524

(22) Filed: Aug. 22, 2018

(65) Prior Publication Data

US 2019/0065717 A1 Feb. 28, 2019

(30) Foreign Application Priority Data

Aug. 22, 2017 (KR) .......................... 10-2017-0105930

(51) Int. Cl.
*G06F 21/00* (2013.01)
*G06F 21/32* (2013.01)
(Continued)

(52) U.S. Cl.
CPC ............ *G06F 21/32* (2013.01); *G06F 3/0412* (2013.01); *G06K 9/0004* (2013.01);
(Continued)

(58) Field of Classification Search
CPC ...... G06F 21/32; G06F 3/0412; G06F 1/1626; G06K 9/0004; G06K 9/2018;
(Continued)

(56) References Cited

U.S. PATENT DOCUMENTS

2013/0005458 A1* 1/2013 Kosta ...................... A63F 13/25
463/31
2015/0310251 A1 10/2015 Wyrwas et al.
(Continued)

FOREIGN PATENT DOCUMENTS

JP 2016-120212 7/2016
KR 10-2016-0117860 10/2016
(Continued)

OTHER PUBLICATIONS

Lee et al., "Alignment-Free Cancelable Fingerprint Templates Based on Local Minutiae Information", IEEE Transactions on Systems, Man, and Cybernetics, Part B (Cybernetics) ( vol. 37, Issue: 4, Aug. (Year: 2007).*
(Continued)

*Primary Examiner* — Morshed Mehedi
(74) *Attorney, Agent, or Firm* — Nixon & Vanderhye P.C.

(57) ABSTRACT

An apparatus and method for obtaining biometric information in an electronic device are provided. The electronic device includes a display comprising one or more pixels, the one or more pixels including a first sub pixel, a second sub pixel, and a third sub pixel, and one or more sensors configured to obtain biometric information about an external object, and a processor. The processor is configured to cause the electronic device to: identify first biometric information and second biometric information from the biometric information, and output light having first properties through a first pixel set corresponding to the first biometric information, and obtain the first biometric information using the one
(Continued)

or more sensors, and output light having second properties through a second pixel set corresponding to the second biometric information, and obtain the second biometric information using the one or more sensors.

20 Claims, 33 Drawing Sheets

(51) Int. Cl.
*G09G 5/00* (2006.01)
*G06F 3/041* (2006.01)
*G06K 9/20* (2006.01)
*G06K 9/00* (2006.01)
*G09G 3/20* (2006.01)

(52) U.S. Cl.
CPC ....... *G06K 9/00087* (2013.01); *G06K 9/2018* (2013.01); *G09G 3/20* (2013.01); *G09G 5/003* (2013.01); *G09G 2358/00* (2013.01); *G09G 2360/148* (2013.01)

(58) Field of Classification Search
CPC ...... G06K 9/00087; G09G 3/20; G09G 5/003; G09G 2360/148; G09G 2358/00; H04L 9/3231
See application file for complete search history.

(56) References Cited

U.S. PATENT DOCUMENTS

| | | | |
|---|---|---|---|
| 2015/0364107 A1* | 12/2015 | Sakariya | G06F 3/042 345/174 |
| 2017/0169275 A1* | 6/2017 | Mackey | G09G 3/3426 |
| 2017/0316248 A1* | 11/2017 | He | G06K 9/036 |
| 2017/0337413 A1* | 11/2017 | Bhat | G06K 9/0012 |

FOREIGN PATENT DOCUMENTS

| | | |
|---|---|---|
| KR | 10-2016-0147943 | 12/2016 |
| KR | 10-2017-0017588 | 2/2017 |

OTHER PUBLICATIONS

Extended Search Report dated Jan. 28, 2019 in counterpart European Patent Application No. EP18190131.5.
Communication pursuant to Article 94(3) EPC dated May 27, 2020 in counterpart European Patent Application No. EP18190131.5.

* cited by examiner

METHOD FOR OBTAINING BIOMETRIC INFORMATION USING LIGHT SOURCE CORRESPONDING TO BIOMETRIC INFORMATION AND ELECTRONIC DEVICE THEREOF

CROSS-REFERENCE TO RELATED APPLICATION

This application is based on and claims priority under 35 U.S.C. § 119 to Korean Patent Application No. 10-2017-0105930, filed Aug. 22, 2017, in the Korean Intellectual Property Office, the disclosure of which is incorporated by reference herein in its entirety.

BACKGROUND

Field

The disclosure relates to an apparatus and method for obtaining biometric information using a light source corresponding to the biometric information in an electronic device.

Description of Related Art

With the growth of information telecommunication technologies and semiconductor technologies, various electronic devices are developing into multimedia devices providing various multimedia services. For example, the multimedia service can include at least one of a voice call service, a message service, a broadcasting service, a wireless Internet service, a camera service, and a music play service.

As the multimedia services of the electronic device become diversified, private information stored in the electronic device is increasing. The electronic device can provide an authentication service for protecting the private information stored in the electronic device from others. For example, the electronic device can provide an authentication service (e.g., a biometric recognition service) that utilizes biometric information such as an iris, a fingerprint, a face, a palm line, a vein, etc.

SUMMARY

An electronic device can obtain a fingerprint image for user authentication using a fingerprint scan sensor operatively coupled to the electronic device. The fingerprint scan sensor can divide a ridge and valley of the human body who gets in contact with the fingerprint scan sensor, to obtain the fingerprint image. The electronic device can authenticate a user, based on a similarity between the fingerprint image obtained through the fingerprint scan sensor and a predefined reference fingerprint image.

However, there can be a problem in which the fingerprint scan sensor cannot distinguish a fingerprint cloned using a substance having a similar external shape or character to the skin of the human body.

Various embodiments of the disclosure may provide an apparatus and method for improving an accuracy of authentication of biometric information in an electronic device.

According to various embodiments of the disclosure, an electronic device may include a display configured to include one or more pixels, the one or more pixels comprising a first sub pixel capable of outputting light having a first wavelength range, a second sub pixel capable of outputting light having a second wavelength range, and a third sub pixel capable of outputting light having a third wavelength range, one or more sensors configured to obtain biometric information about an external object, and a processor, and the processor may be configured to cause the electronic device to: identify situation information related with the external object, and identify first biometric information and second biometric information from the biometric information, based at least on the situation information, and output light having first properties through a first pixel set corresponding to the first biometric information among the first sub pixel, the second sub pixel, and the third sub pixel, and obtain the first biometric information using the one or more sensors, and output light having second properties through a second pixel set corresponding to the second biometric information among the first sub pixel, the second sub pixel, and the third sub pixel, and obtain the second biometric information using the one or more sensors.

According to various embodiments of the disclosure, a method of operating an electronic device may include identifying situation information related with an external object, and identifying first biometric information and second biometric information from among biometric information, based at least on the situation information, and outputting light having first properties through a first pixel set corresponding to the first biometric information among a first sub pixel, a second sub pixel, and a third sub pixel in a display device comprising one or more pixels comprising the first sub pixel capable of outputting light having a first wavelength range, the second sub pixel capable of outputting light having a second wavelength range, and the third sub pixel capable of outputting light having a third wavelength range, and obtaining the first biometric information using light reflected from the external object, and outputting light having second properties through a second pixel set corresponding to the second biometric information among the first sub pixel, the second sub pixel, and the third sub pixel, and obtaining the second biometric information using light reflected from the external object.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Various example embodiments of the disclosure are described below in greater detail with reference to the accompanying drawings. In describing various embodiments of the disclosure, related well-known functions or constructions may not described in detail if they obscure the gist of the disclosure with unnecessary detail. The terms described below are defined considering functions in the disclosure, and may be modified in accordance to user and operator's intention or practice. Therefore, the definition is based on the content of the description throughout the present disclosure.

Figure 1:
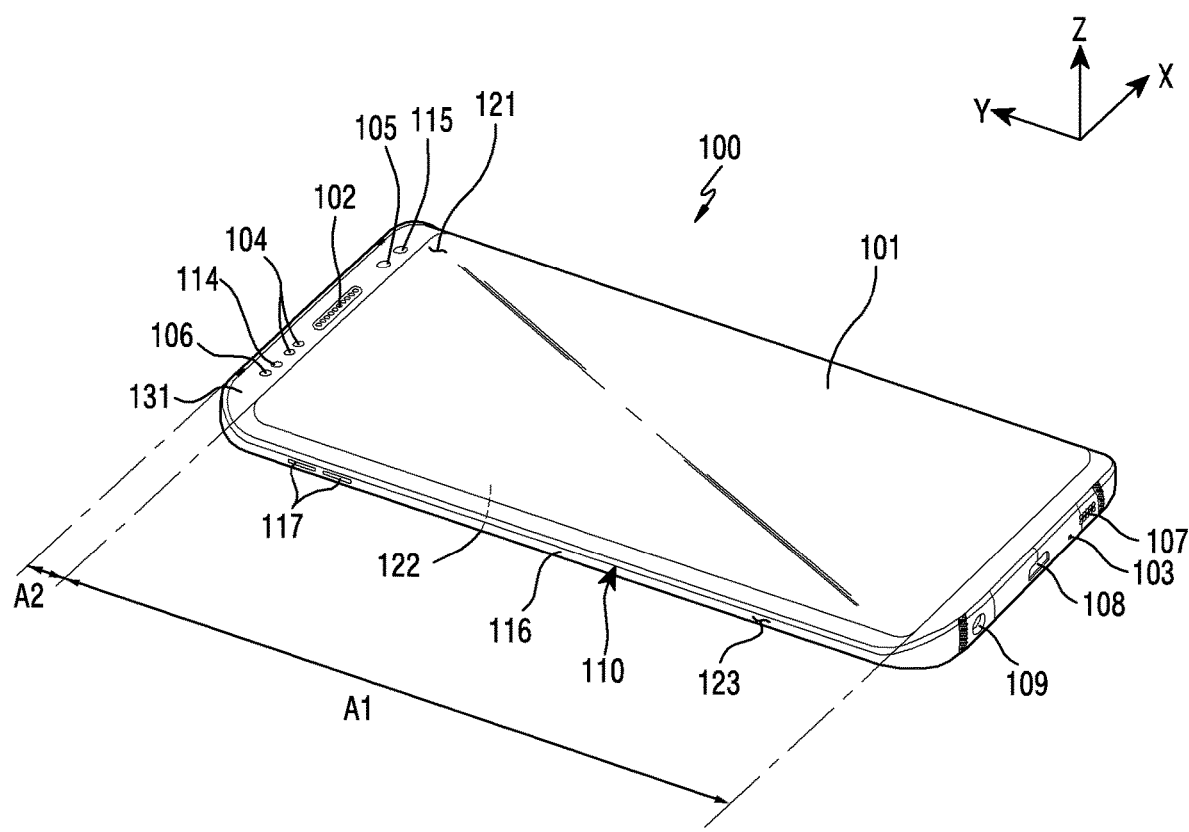
FIG. 1 is a diagram illustrating a perspective view of an electronic device according to various embodiments of the disclosure.

FIG. 1 is a diagram illustrating a perspective view of an electronic device according to various embodiments of the disclosure.

Referring to FIG. 1, the electronic device 100 may include a housing 110. For example, the housing 110 may be formed a conductive member and/or non-conductive member.

According to an embodiment, the housing 110 may include a first surface 121 (e.g., a front surface or top surface) facing a first direction (e.g., a Z-axis direction), a second surface 122 (e.g., a rear surface or bottom surface) disposed in a direction of oppositely facing the first surface 121, and a side surface 123 disposed surrounding at least a part of the first surface 121 and second surface 122. For example, the side surface 123 may be coupled with a front plate 131 and a rear plate, and may be formed to have a side bezel structure 116 including metal and/or polymer.

According to an embodiment, the electronic device 100 may include the front plate 131 (e.g., a window or glass plate) disposed in the first surface 121, and may be disposed to expose a display 101 through a first region (A1) of the front plate 131.

According to an embodiment, the electronic device 100 may include a call receiver hole 102. For example, the electronic device 100 may be controlled to use a speaker disposed therein and make a call with a counterpart through the call receiver hole 102.

According to an embodiment, the electronic device 100 may include a microphone hole 103. For example, the electronic device 100 may use at least one microphone capable of being disposed therein and sensing a direction of sound and may receive an external sound through the microphone hole 103 or transmit a voice of a user to a counterpart.

According to an embodiment, the electronic device 100 may include at least one key input device 117. For example, the key input device 117 may include at least one side key button 117 disposed in the side surface 123 of the housing 110. The at least one side key button 117 may include, for example, and without limitation, a volume adjustment button, a power button or a specific function (e.g., artificial intelligence execution function, fast voice recognition execution mode enable function, or the like.) execution button, or the like.

According to an embodiment, the electronic device 100 may include components that are disposed in a scheme of being exposed to the display 101, or performing a function through the front plate 131 but not being exposed, to perform various functions of the electronic device 100. For example, at least some of the components may be disposed through a second region (A2) of the front plate 131. For example, the components may include at least one sensor module 104. For example, the sensor module 104 may include an illuminance sensor (e.g., light sensor), a proximity sensor (e.g., a light sensor), an infrared ray sensor, an ultrasonic sensor, a fingerprint scan sensor, a face recognition sensor, or an iris scan sensor, or the like, but is not limited thereto. For example, the component may include a first camera device 105. For example, the component may include an indicator 106 (e.g., a light emitting diode (LED) device, or the like) for visually providing state information of the electronic device 100 to a user. For example, the component may include a light source 114 (e.g., infrared ray LED, or the like) disposed at one side of the receiver 102. For example, the component may include an imaging sensor assembly 115 (e.g., an iris camera, or the like) for obtaining an iris image in a state where light provided from the light source 114 is irradiated around user's eyes. For instance, at least one of the components may be disposed to be exposed through at least a partial region of the second surface 122 (e.g., rear surface or back surface) facing a direction (e.g., −Z-axis direction) oppositely facing the first direction of the electronic device 100 as well.

According to an embodiment, the electronic device 100 may include an external speaker hole 107. According to an embodiment, the electronic device 100 may use a speaker disposed therein, and emit sound through the external speaker hole 107. According to an embodiment, the electronic device 100 may include a first connector hole 108 (e.g., interface connector port, or the like) for performing a function of data transmission/reception with an external device and receiving external power to charge the electronic device 100. According to an embodiment, the electronic device 100 may include a second connector hole 109 (e.g., ear jack assembly, or the like) for housing an ear jack of the external device.

According to an embodiment, the display 101 may be used for data output, and be used as an obtaining member (e.g., circuitry) for obtaining biometric information. For example, the display 101 may be used as a fingerprint recognition sensor for obtaining a fingerprint image of a user. In this case, the whole region (A1 region) of the display 101 may be utilized as a region for fingerprint recognition. Accordingly, in response to the display 101 being used for a fingerprint recognition function, a fingerprint may be recognized even if the user makes contact with any region among the display region (A1 region). For example, it may be utilized as a medical sensor for measuring biometric information (e.g., a fingerprint image, a blood flow rate, or the like, but is not limited thereto) of the human body that makes contact with the display 101 using, as a light source, at least one sub pixel included in each pixel of the display 101.

According to an embodiment, the display 101 may include the front plate 131 disposed to be exposed through at least a partial region of the first surface 121 of the electronic device 100. For example, the display 101 may include a touch panel and a display panel which may, for example, be sequentially laminated on a rear surface of the front plate 131. For example, an image displayed through the display panel may be provided to a user through the front plate 131 of transparent materials. For example, the front plate 131 may use various materials such as transparent glass, acryl, or the like. For example, the display 101 may obtain a fingerprint image, based on a value obtained through an image sensor disposed in a rear surface of the display panel. For example, the display 101 may obtain a fingerprint image, based on a value obtained through a light receiving module (e.g., photodiode, or the like) disposed in at least one pixel of the display panel.

Figure 2:
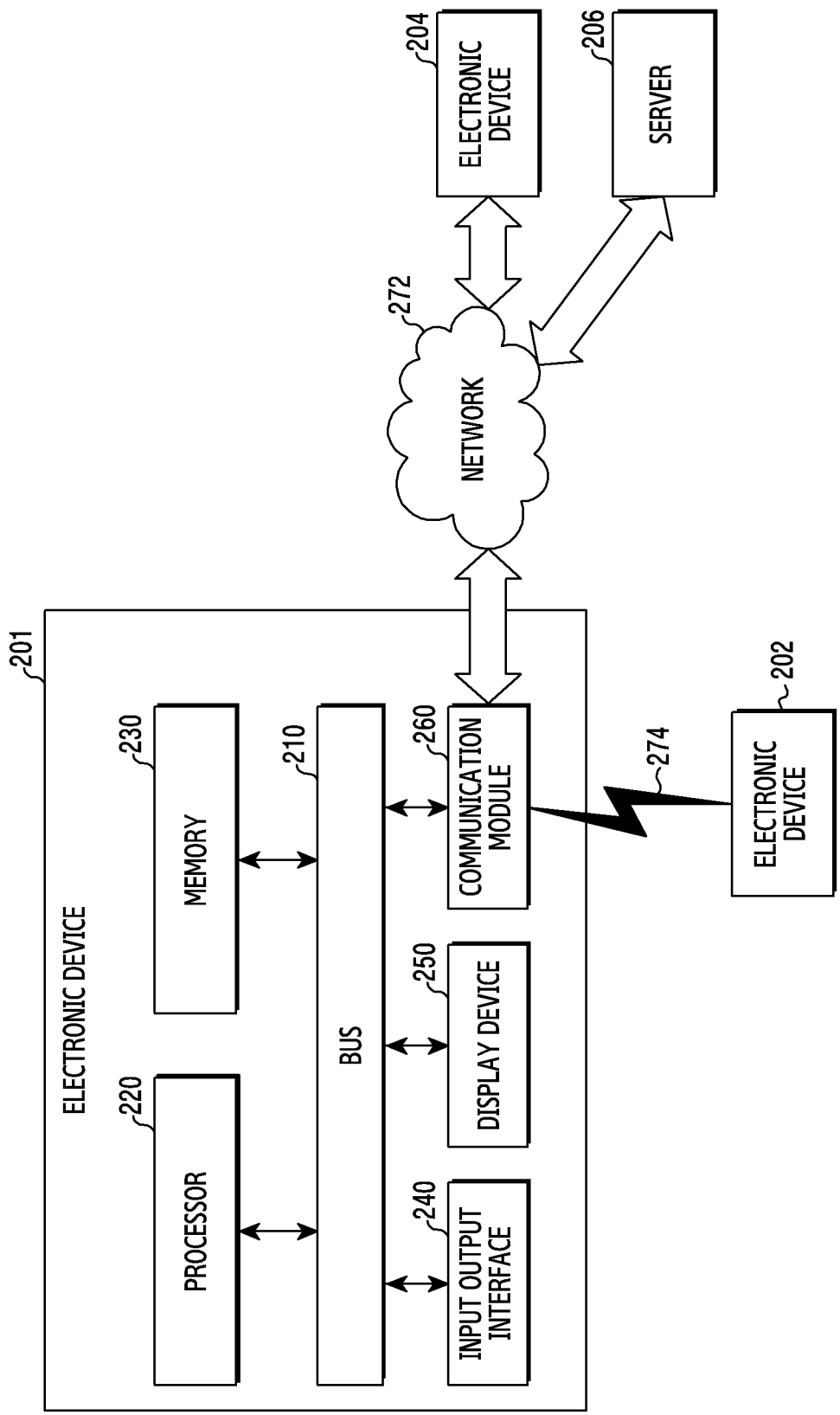
FIG. 2 is a block diagram illustrating an electronic device for obtaining biometric information using a light source corresponding to the biometric information according to various embodiments of the disclosure.

FIG. 2 is a block diagram illustrating an electronic device according to various embodiments of the disclosure. In the following description, the electronic device 201 may include the whole or at least part of the electronic device 100 of FIG. 1.

Referring to FIG. 2, the electronic device 201 may include a bus 210, a processor (e.g., including processing circuitry) 220, a memory 230, an input output interface (e.g., including input/output circuitry) 240, a display device 250, and a communication module (e.g., including communication circuitry) 260. In an example embodiment, the electronic device 201 may omit at least one of the elements or additionally have another element.

The bus 210 may, for example, include circuitry coupling the elements 220 to 260 with one another and forwarding a signal (e.g., a control message and/or data) between the elements.

The processor 220 may execute operation or data processing for control and/or communication of at least one other element of the electronic device 201. For example, the processor 220 may include various processing circuitry, such as, for example, and without limitation, one or more of a dedicated processor, a central processing unit (CPU), an application processor (AP), a communication processor (CP) and/or an image signal processor (ISP), or the like.

According to an embodiment, the processor 220 may obtain biometric information through the display device 250. For example, the processor 220 may control the display device 250 to emit light from at least one sub pixel corresponding to biometric information intended to be obtained in the electronic device 201 among a plurality of sub pixels (e.g., RGB, RGBG) of, for example, each pixel of the display device 250. The processor 220 may obtain the biometric information using reflected light collected through the display device 250. As an example, the biometric information may, for example, and without limitation, include at least one of a fingerprint, a heartbeat, a stress index, an oxygen saturation, a blood pressure, a blood glucose and/or a skin tone, or the like. As an example, the processor 220 may identify the biometric information for obtaining from an external object, based on the situation information related with the external object. For example, the situation information related with the external object may include at least one of proximity or non-proximity of the external object and the electronic device, an application that is being executed in the electronic device at a timing for obtaining biometric information of the external object, and/or a user interface displayed on a display device.

According to an embodiment, the processor 220 may control to output light through a mutually different pixel set at a mutually different timing. For example, the processor 220 may control the display device 250 to output light of first properties through a first pixel set at a timing for obtaining first biometric information. The processor 220 may obtain the first biometric information, based on reflected light collected through the display device 250. For example, the processor 220 may control the display device 250 to output light of second properties through a second pixel set at a timing for obtaining second biometric information. The processor 220 may obtain the second biometric information, based on reflected light collected through the display device 250. As an example, the timing for obtaining each biometric information may be repeated cyclically during a biometric information obtaining duration. As an example, the pixel set may include at least one, necessary for obtaining biometric information, among a plurality of sub pixels of a pixel and a light emitting module (e.g., infrared ray sensor) disposed in at least one pixel. For instance, the pixel set may, for example, and without limitation, be configured as in Table 1 below.

TABLE 1

| Pixel set | Biometric information |
|---|---|
| Green | Heartbeat |
| IR | Heartbeat, stress, fingerprint |
| IR, red | Oxygen saturation, fingerprint |
| IR, blue, green | Blood pressure, blood glucose, fingerprint |
| IR, red, blue, green | Skin tone, hydration, fingerprint |

According to an embodiment, the processor 220 may control to output light through a mutually different pixel set in a mutually different region among a contact region of the display device 250. For example, the processor 220 may control the display device 250 to output light of first properties through a first pixel set in a first region (e.g., a central region, or the like) among the contact region. The processor 220 may obtain first biometric information (e.g., fingerprint image), based on reflected light corresponding to the light of the first properties collected through the display device 250.

For example, the processor 220 may control the display device 250 to output light of second properties through a second pixel set in a second region (e.g., an edge region, or the like). The processor 220 may obtain the second biometric information, based on reflected light corresponding to the light of the second properties collected through the display device 250. As an example, the contact region may include at least a partial region, which the user's human body makes contact with, of the display device 250.

According to an embodiment, the processor 220 may perform a user authentication procedure using biometric information obtained through the display device 250. For example, the processor 220 may perform an authentication procedure for a user using first biometric information (e.g., a fingerprint image, or the like). In response to the processor 220 succeeding in authenticating the user using the first biometric information, the processor 220 may perform the authentication procedure for the user using second biometric information. In response to the processor 220 succeeding in authenticating the user using the first biometric information and the second biometric information, the processor 220 may identify (determine) that the authentication procedure for the user has been completed.

According to an embodiment, the processor 220 may adaptively store biometric information obtained through the display device 250, based on user authentication information. For example, the processor 220 may measure health information through the display device 250, while collecting fingerprint information. In response to the processor 220 succeeding in user authentication using the fingerprint information, the processor 220 may control the memory 230 to store the health information as information of a corresponding user. In response to the processor 220 failing in the user authentication by the fingerprint information, the processor 220 may control the memory 230 to store the health information as general information. As an example, in response to the processor 220 succeeding in the user authentication, the processor 220 may control the memory 230 to store the health information. As an example, the health information may include information representing a user's health state such as, for example, and without limitation, a heartbeat, a stress index, a blood glucose, a blood pressure, an oxygen saturation, or the like.

The memory 230 may include a volatile and/or non-volatile memory. For example, the memory 230 may store a command or data related to at least one other element of the electronic device 201. The data may include reference biometric information (e.g., a fingerprint image, a biometric change pattern, etc.) defined for user authentication.

The input output interface 240 may forward a command or data inputted from a user or another external device, to the other element(s) of the electronic device 201. For example, the input output interface 240 may include various input/output circuitry, such as, for example, and without limitation, at least one physical button such as a home button, a power button, a volume control button or the like. The input output interface 240 may output a command or data received from the other element(s) of the electronic device 201, to the user or another external device. For example, the input output interface 240 may include a speaker for outputting an audio signal and a microphone for collecting an audio signal.

The display device 250 (e.g., the display) may display various contents (e.g., a text, an image, a video, an icon, a symbol and/or the like) to a user. For example, the display device 250 may include a touch screen. The display device 250 may receive a touch, gesture, proximity or hovering input that utilizes an electronic pen or a part of a user's human body.

According to an embodiment, the display device 250 may obtain biometric information about a part of the human body of a user that makes contact with the display device 250. For example, the display device 250 may output light through at least one sub pixel corresponding to biometric information for obtaining from the electronic device 201 among a plurality of sub pixels (red, green, blue, and IR) of at least one pixel of the display device 250. The display device 250 may collect light reflected from a part of the human body through a light receiving module, to obtain biometric information (e.g., fingerprint image, or the like) of a user.

The communication module 260 (e.g., communication interface) may include various communication circuitry and establish communication between the electronic device 201 and an external device (e.g., a first external electronic device 202, a second external electronic device 204, or a server 206). For example, the communication module 260 may be coupled to a network 272 through wireless communication or wired communication, to communicate with the external device (e.g., the second external electronic device 204 or the server 206). For example, the communication module 260 may communicate with the external device (e.g., the first external electronic device 202) through short range communication 274.

FIGS. 3A, 3B, 3C, 3D and FIG. 3E are diagrams illustrating a schematic structure of a display device according to various embodiments of the disclosure. In the following description, the display device 300 may include the whole or at least part of the display device 250 of FIG. 2.

Figure 3A:
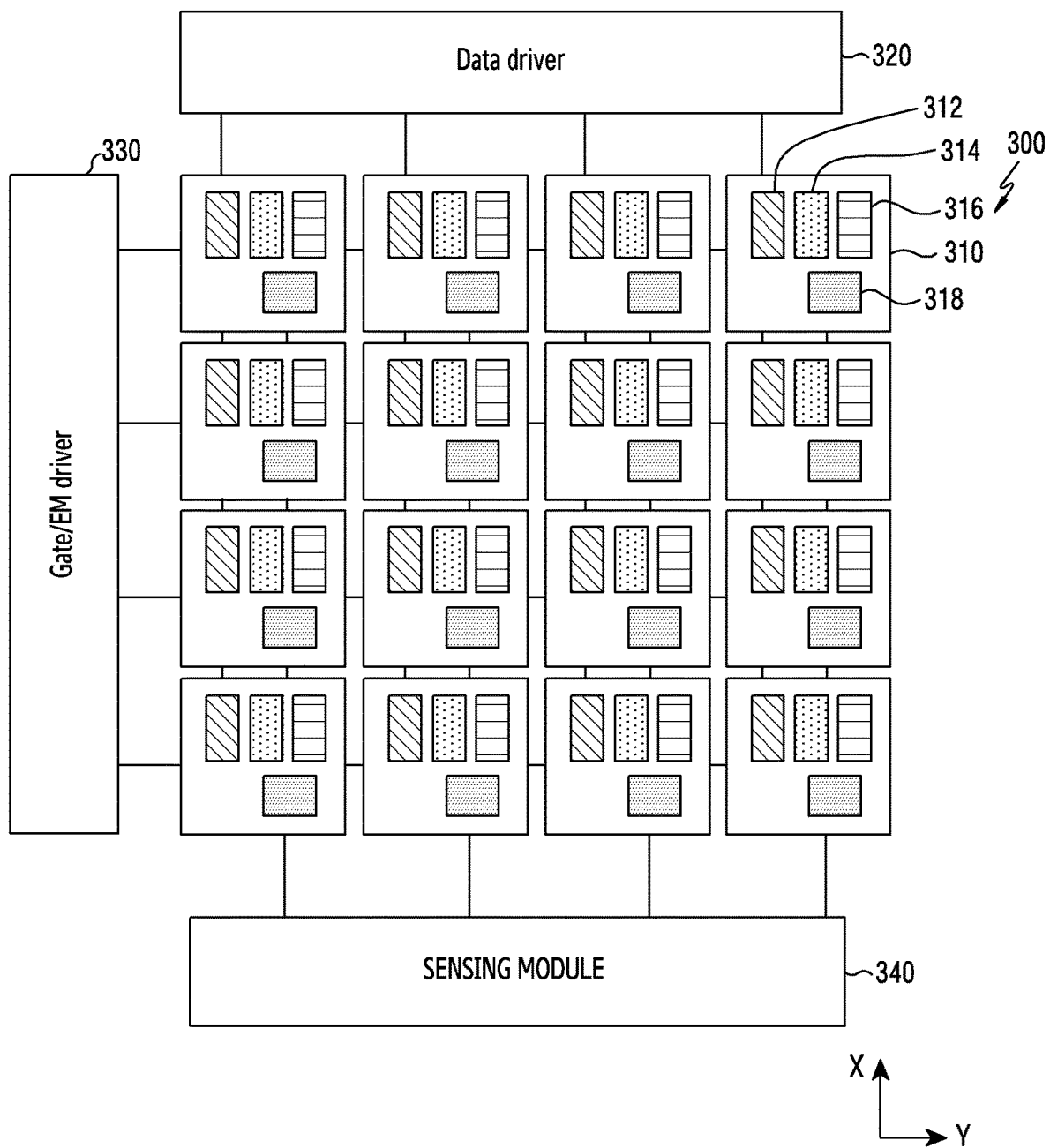
FIGS. 3A, 3B, 3C, 3D and FIG. 3E are diagrams illustrating a schematic structure of a display device according to various embodiments of the disclosure.

According to an embodiment, as illustrated in FIG. 3A, the display device 300 may include a plurality of pixels. Each pixel 310 may include a first sub pixel 312 outputting light of a first color, a second sub pixel 314 outputting light of a second color, a third sub pixel 316 outputting light of a third color, and a light receiving module (e.g., including light receiving circuitry) 318 receiving external light. As an example, the display device 300 may obtain biometric information in the whole region of the display device 300. As an example, the display device 300 may control the light receiving module 318 of each pixel 310 to obtain biometric information in a partial region of the display device 300. For instance, the display device 300 may activate the light receiving module 318 of the pixel 310 disposed in a biometric information obtaining region, and inactivate a light receiving module 318 of a pixel disposed in the remnant region.

According to an embodiment, the plurality of pixels may be arranged in a matrix form, and the number of pixels disposed in a first direction (X) and a second direction (Y) may be identified according to a resolution of the display device 300. For instance, the first direction (X) may, for example, be a long side direction of the display device 300, and the second direction (Y) may, for example, be a short side direction of the display device 300 that is substantially vertical to the first direction (X).

According to an embodiment, the first sub pixel 312 to third sub pixel 316 may output light of mutually different first color to third color. For example, referring to FIG. 3B, the first sub pixel 312 may output red (R) light, and the second sub pixel 314 may output green (G) light, and the third sub pixel 316 may output blue (B) light.

According to an embodiment, at least one sub pixel among the first sub pixel 312 to the third sub pixel 316 may output infrared light.

According to an embodiment, the display device 300 may apply a power source to the first sub pixel 312 to third sub pixel 316 through a gate driver (or emission driver) 330, to control a light emitting timing of each sub pixel. A data driver 320 may provide a data value by each pixel 310, to display natural color and brightness by each pixel 310. Each pixel 310 may express natural color by means of the first sub pixel 312 to the third sub pixel 316.

Figure 3B:
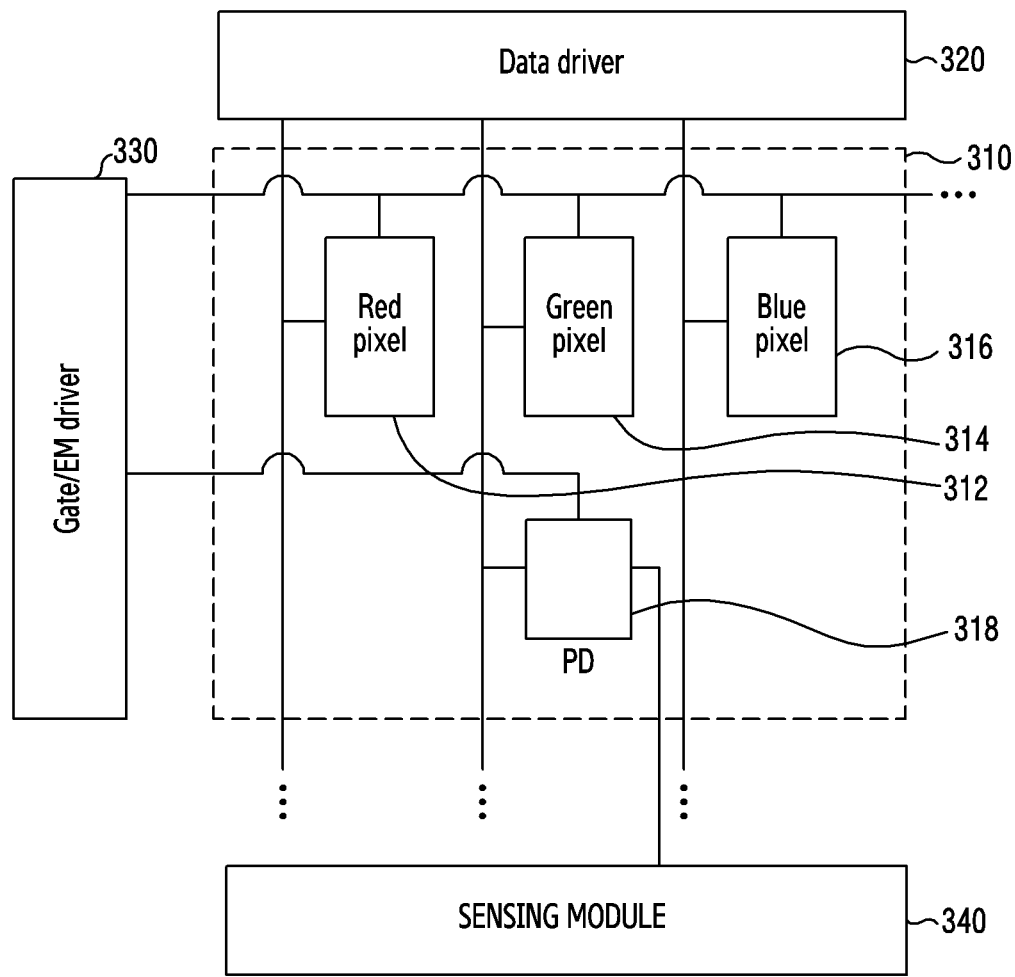

According to an embodiment, the light receiving module 318 may collect light that is introduced from the external or is reflected from an external object (e.g., a finger, or the like) approaching and/or contacting the display device 300. For example, the light receiving module 318 may include a light converting member including circuitry for filtering light of a specific wavelength band and thus, obtain a light quantity of the light of the specific wavelength band filtered through the light converting member. As an example, the light receiving module 318 may perform a fingerprint recognition function by obtaining a mutually different light quantity reflected from a ridge of a finger of a user and a valley between the ridges. As an example, the light receiving module 318 may perform a biometric recognition function by obtaining a light quantity that is reflected from a blood flow rate of the human body of the user. As an example, as illustrated in FIG. 3B, the light receiving module 318 may include various light receiving circuitry, such as, for example, and without limitation, a photo diode, or the like.

According to an embodiment, the light receiving module 318 may recognize light emitting timings of the sub pixels 312 to 316, based on power supply information of the gate driver 330. Light information collected in the light receiving module 318 may be forwarded to a sensing module (e.g., including light sensing circuitry) 340.

Figure 3C:
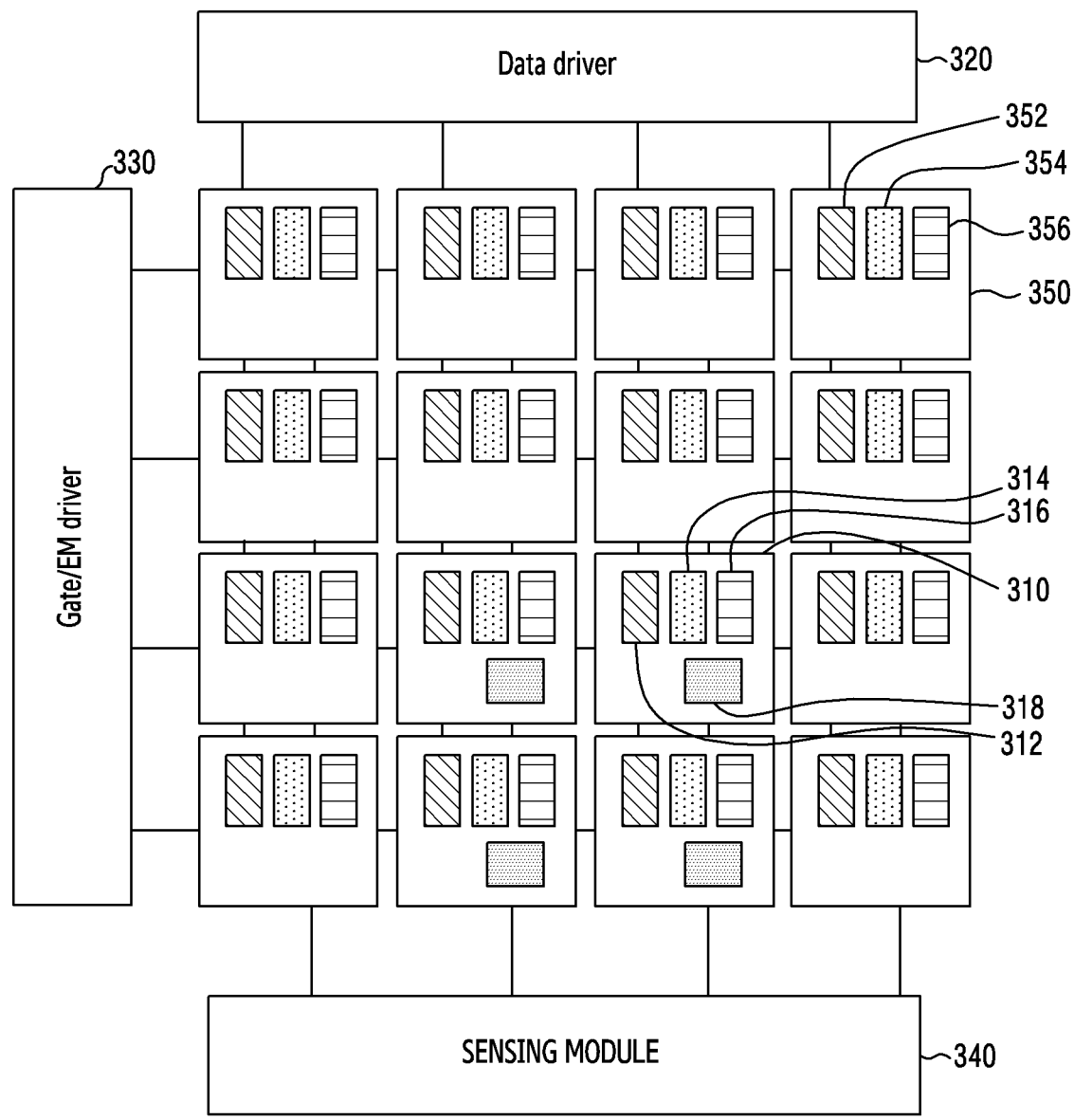

According to an embodiment, as illustrated in FIG. 3C, the display device 300 may include the light receiving modules 318 in a part of (or a subset of) a plurality of pixels. For example, the pixel 310 included in a partial region set to collect biometric information among the display device 300 may include the first sub pixel 312, the second sub pixel 314, the third sub pixel 316, and the light receiving module 318. Whereas, a pixel 350 included in the remnant region among the display device 300 may include a first sub pixel 352, a second sub pixel 354 and a third sub pixel 356.

According to an embodiment, the pixel 310 including the light receiving module 318 may be disposed adjacently or at a given interval in the whole region or partial region of the display device 300.

Figure 3D:
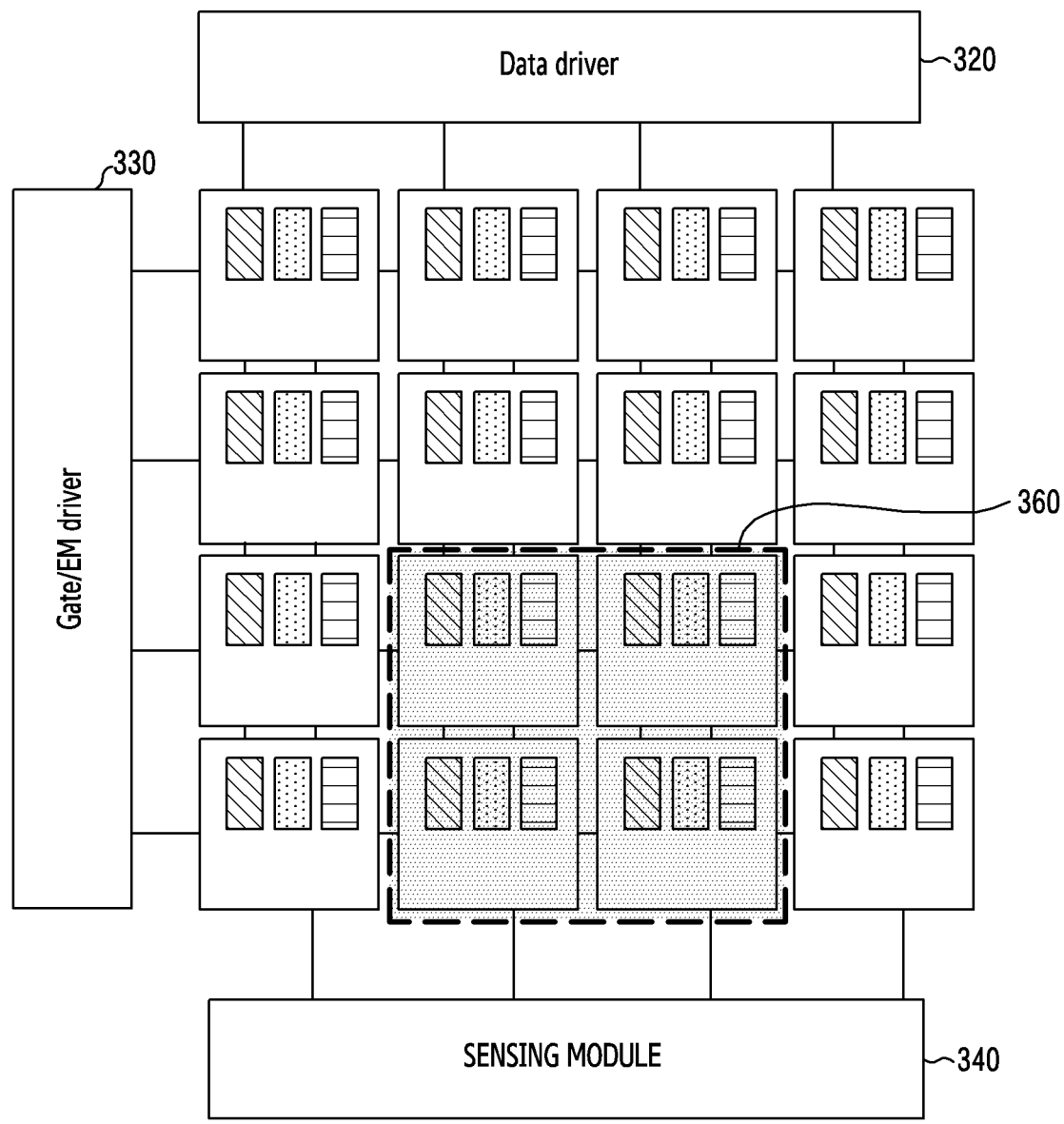

According to an embodiment, as illustrated in FIG. 3D, the display device 300 may include a plurality of pixels, and each pixel 350 may include the first sub pixel 312, the second sub pixel 314 and the third sub pixel 316. The display device 300 may include an image sensor 360 in a rear surfaces of a pixel disposed in a partial region, which is set to collect biometric information. For example, the image sensor 360 may collect light that is reflected from an external object approaching and/or contacting the display device 300. As an example, the image sensor 360 may include a light converting member (e.g., including light converting circuitry) for filtering light of a specific wavelength band and thus, obtain the light of the specific wavelength band filtered through the light converting member.

Figure 3E:
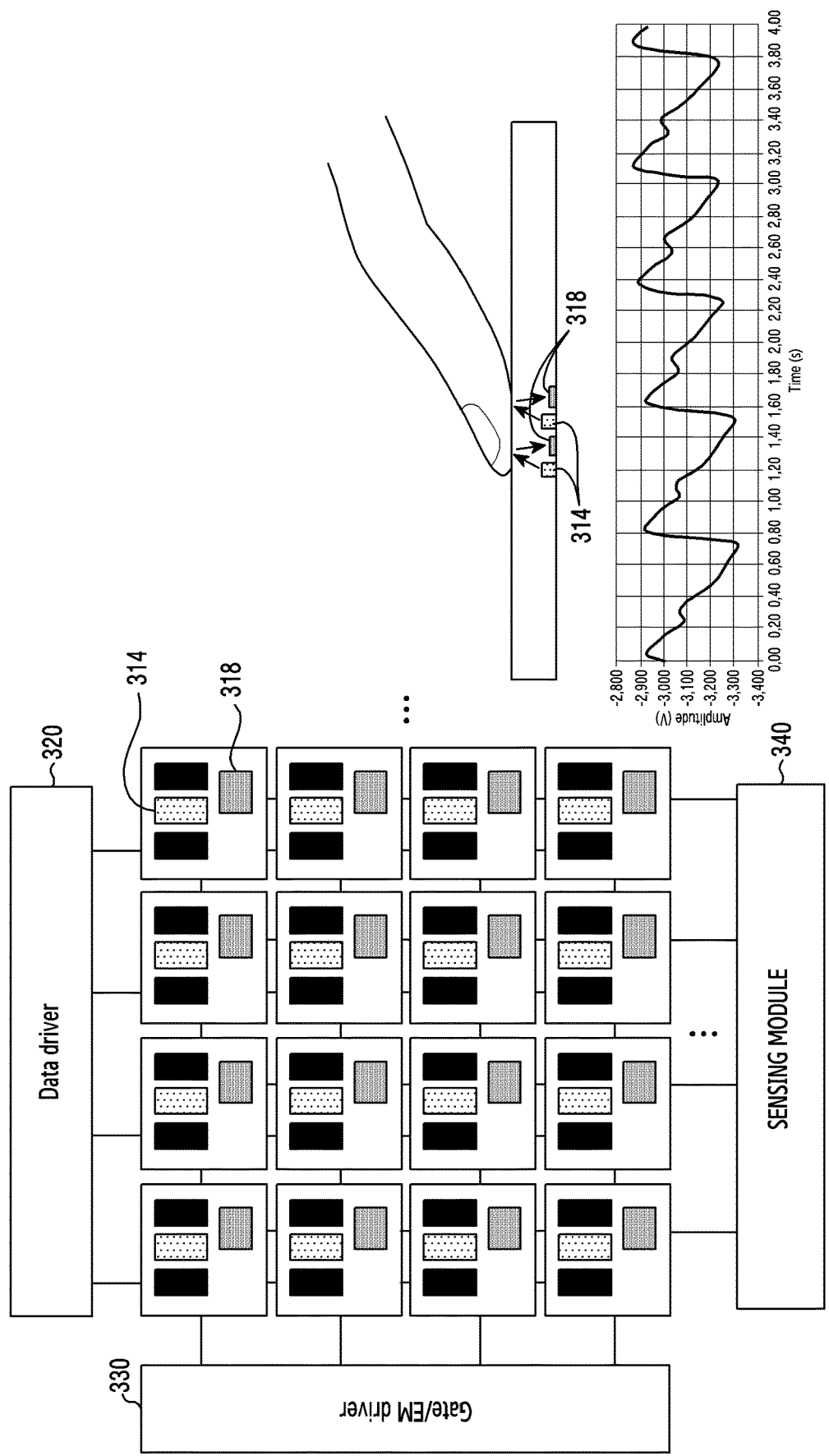

According to an embodiment, the display device 300 may independently control each of the first sub pixel 312 to third sub pixel 316 of each pixel 310 through the gate driver 330 and the data driver 320. For example, as illustrated in FIG. 3E, the display device 300 may drive the second sub pixel 314 and the light receiving module 318, to obtain biometric information (e.g., a heartbeat, or the like). For example, an absorbance of green light (e.g., a wavelength of about 520 nm to 565 nm) by oxyhemoglobin ($HbO_2$) is high, so the green light may be easy to measure a heartbeat. According to this example, the display device 300 may apply a power source through the data driver 320 and the gate driver 330, to output the green light through the second sub pixel 314. The display device 300 may collect a light quantity reflected from the human body using the light receiving module 318. By analyzing the reflected light quantity collected from the display device 300, the processor 220 may obtain heartbeat information 370 of a user.

According to various embodiments of the disclosure, a pixel disposed in the display device 300 may include a sub pixel of red green blue green (RGBG), red green blue yellow (RGBY) or red green blue white (RGBW) as well.

FIG. 4A to FIG. 4F are diagrams illustrating another example of a schematic structure of a display device according to various embodiments of the disclosure. In the following description, the display device 400 may include the whole or at least part of the display device 250 of FIG. 2.

Figure 4A:
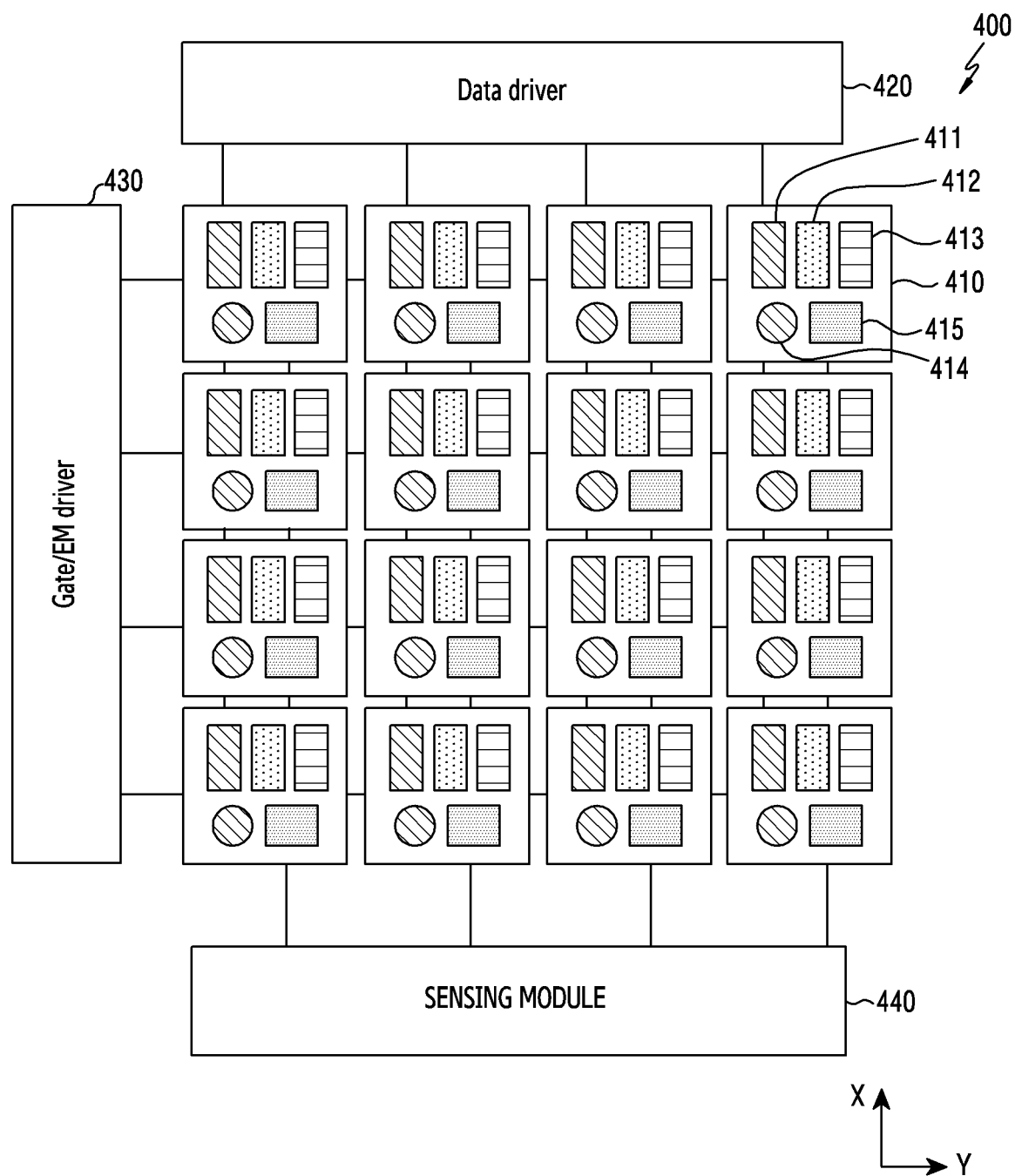
FIGS. 4A, 4B, 4C, 4D, 4E and FIG. 4F are diagrams illustrating another example of a schematic structure of a display device according to various embodiments of the disclosure.

According to an embodiment, as illustrated in FIG. 4A, the display device 400 may include a plurality of pixels. Each pixel 410 may include a first sub pixel 411, a second sub pixel 412, a third sub pixel 413, an infrared ray sensor 414, and a light receiving module (e.g., including light receiving circuitry) 415. For example, the first sub pixel 411 to third sub pixel 413 may output light of mutually different first color to third color. As an example, referring to FIG. 4B, the first sub pixel 411 may output red (R) light, and the second sub pixel 412 may output green (G) light, and the third sub pixel 413 may output blue (B) light.

According to an embodiment, light emitting timings of the first sub pixel 411 to third sub pixel 413 may be determined and provided by a power source applied through a gate driver 430. The first sub pixel 411 to third sub pixel 413 may emit light to express a color corresponding to a data value provided by a data driver 420. A light emitting timing of the infrared ray sensor 414 may be identified by the gate driver 430, and a light emitting intensity of the infrared ray sensor 414 may be identified by the data driver 420.

Figure 4B:
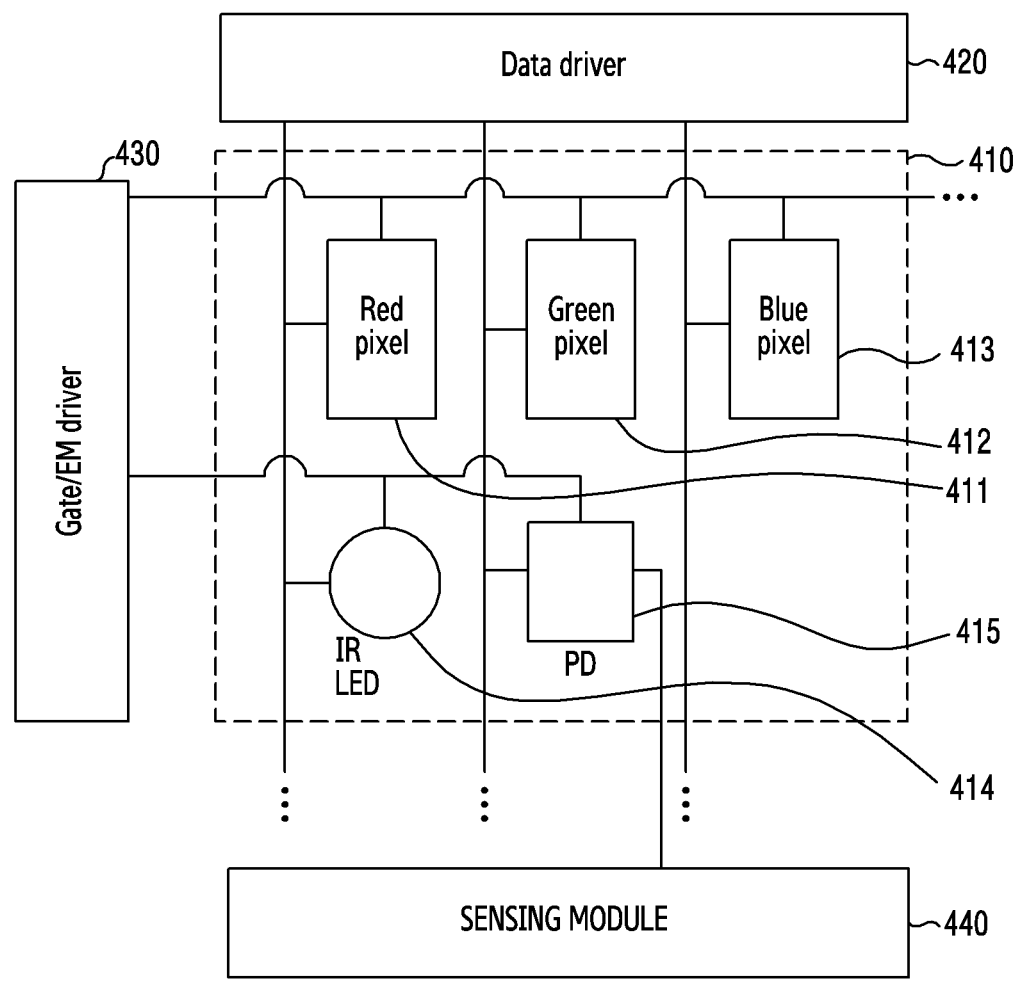

According to an embodiment, the light receiving module 415 may collect light that is introduced from the external or is reflected from an external object (e.g., a finger, or the like) approaching and/or contacting the display device 400. For example, the light receiving module 415 may obtain light of a specific wavelength band that is filtered through a light converting member disposed on the light receiving module 415. As an example, as illustrated in FIG. 4B, the light receiving module 415 may include, for example, and without limitation, a photo diode, or the like.

Figure 4C:
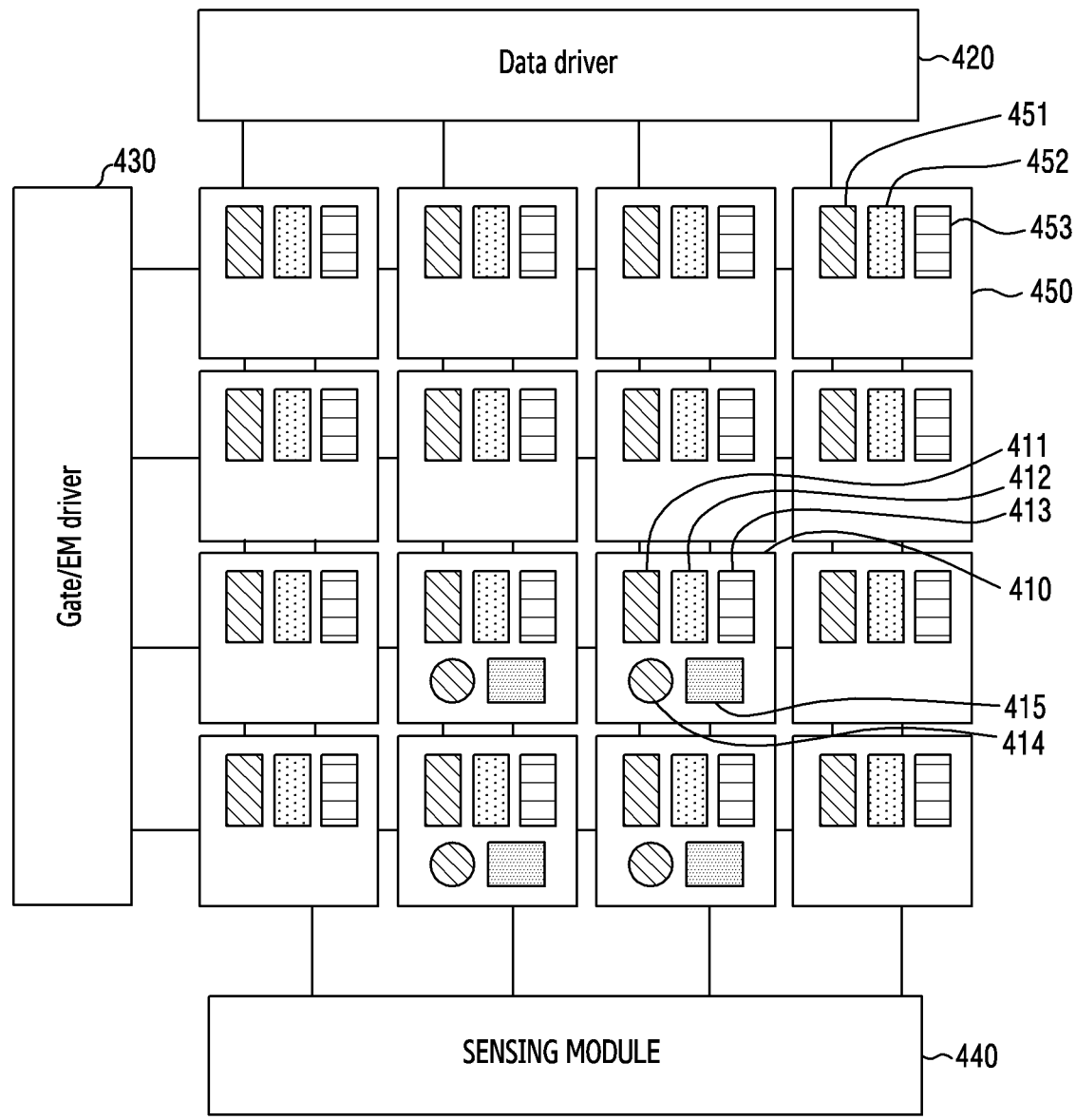

According to an embodiment, as illustrated in FIG. 4C, the display device 400 may include a light receiving module (e.g., including light receiving circuitry) 415 in a partial pixel 410 among a plurality of pixels. For example, the pixel 410 included in a partial region set to collect biometric information among the display device 400 may include a first sub pixel 411 to third sub pixel 413, an infrared ray sensor 414, and a light receiving module 415. A pixel 450 included in the remnant region among the display device 400 may include a first sub pixel 451 to a third sub pixel 453.

Figure 4D:
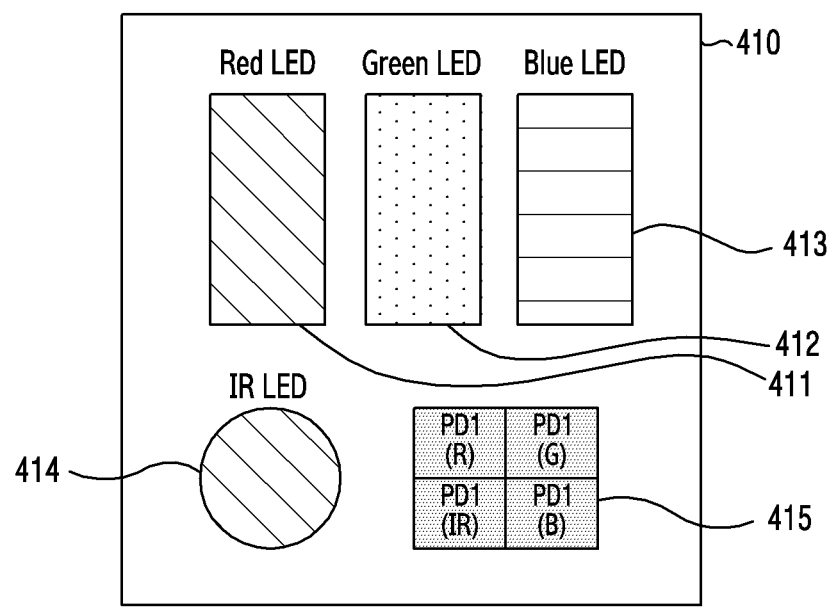

According to an embodiment, as illustrated in FIG. 4D, a light receiving region of the light receiving module 415 may be separated to collect light of a mutually different wavelength. For example, the light receiving module 415 may include, for example, and without limitation, a plurality of photo diodes, or the like, configured to collect light of mutually different wavelengths. For example, each photo diode may include a mutually different light converting member which filters light of a mutually different wavelength band.

According to an embodiment, the pixel 410 including the infrared ray sensor 414 and the light receiving module 415 may be disposed adjacently or at a given interval in the whole region or partial region of the display device 400.

Figure 4E:
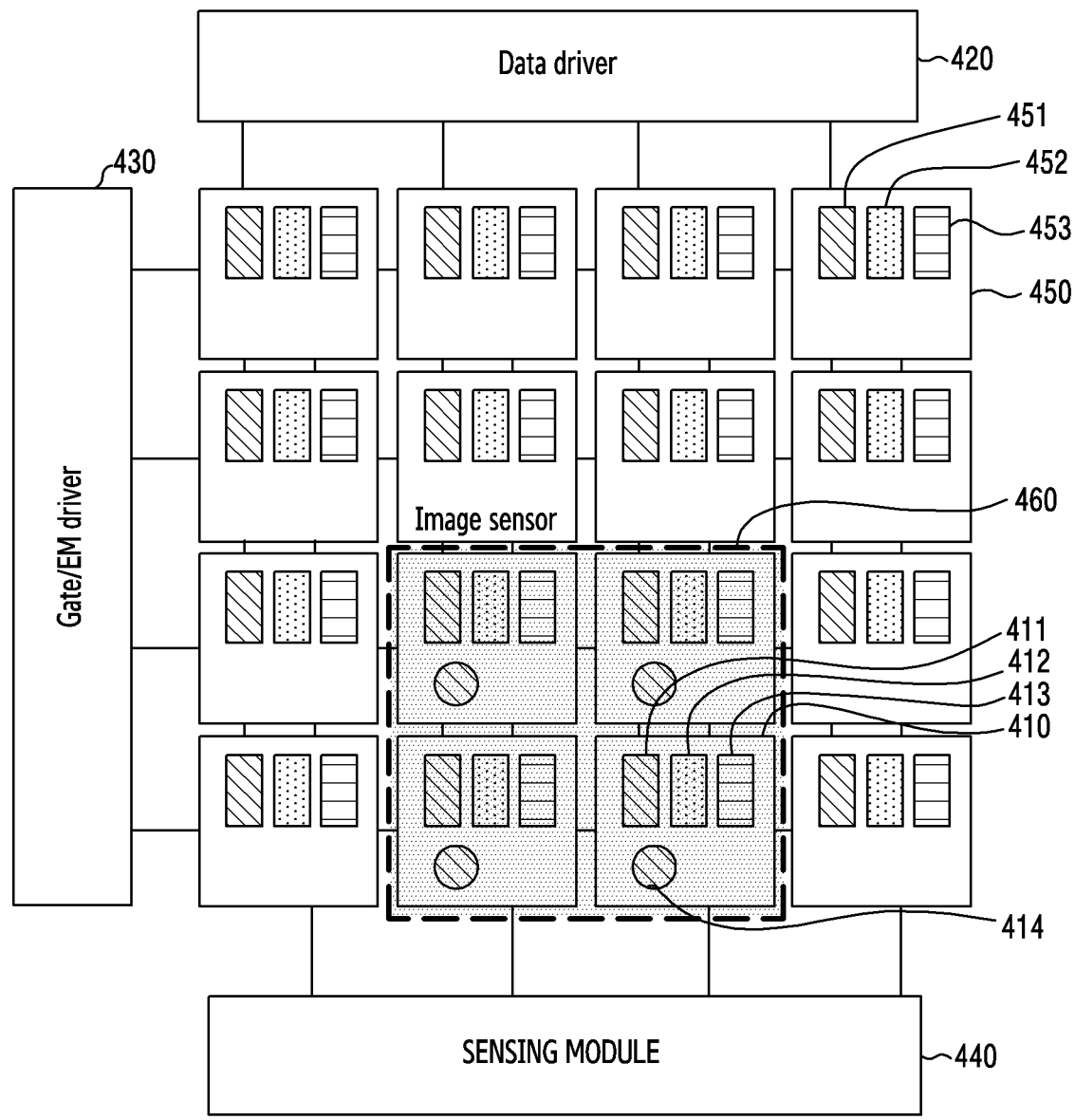

According to an embodiment, as illustrated in FIG. 4E, the display device 400 may collect light reflected from an external object (e.g., a finger, or the like) using an image sensor 460. For example, the display device 400 may include the image sensor 460 in a rear surface of a pixel disposed in a partial region set to collect biometric information. A pixel 410 included in the partial region set to collect the biometric information may include a first sub pixel 411 to a third sub pixel 413, and an infrared ray sensor 414. A pixel 450 included in the remnant region may include a first sub pixel 451 to a third sub pixel 453.

Figure 4F:
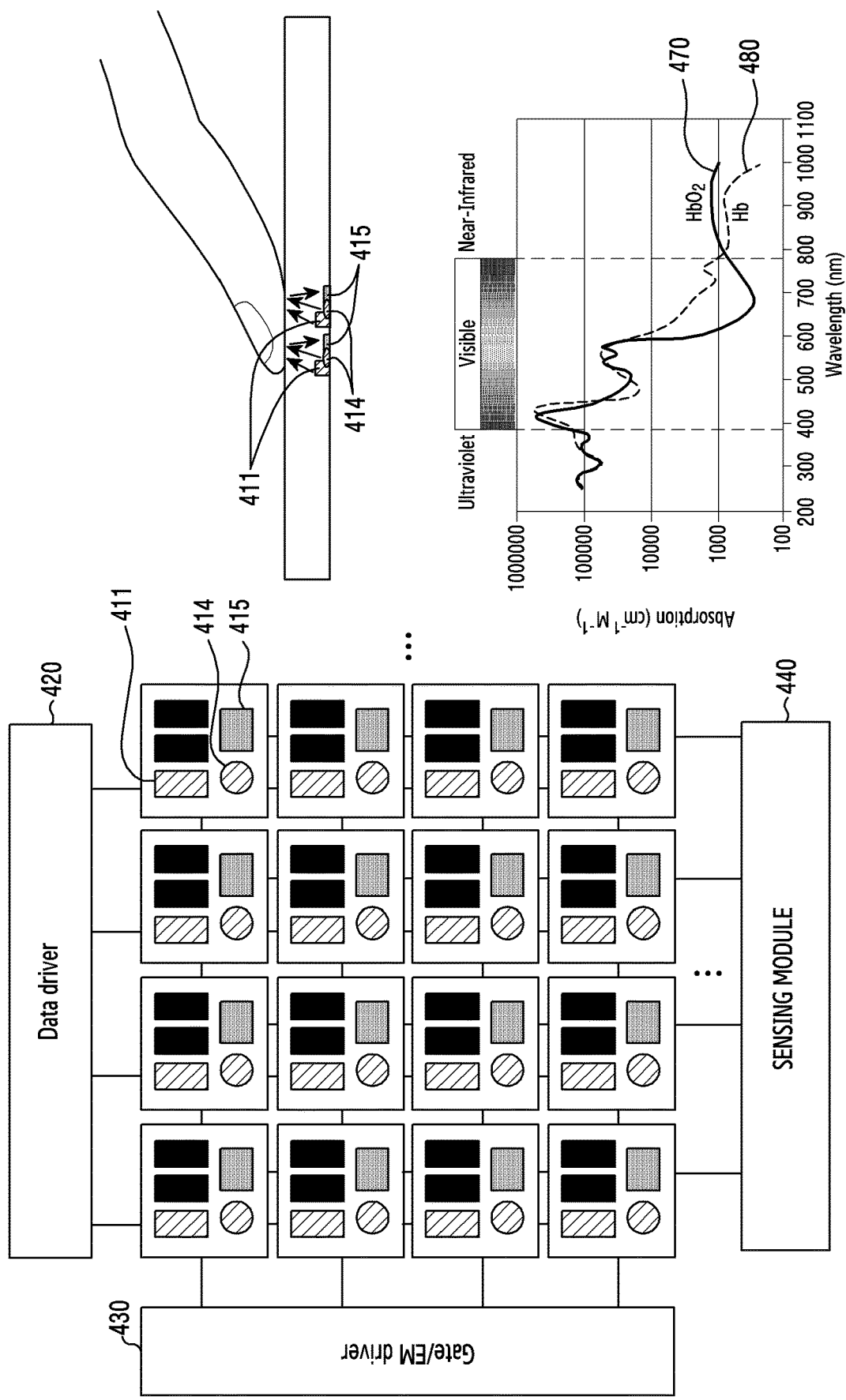

According to an embodiment, the display device 400 may independently control each of a first sub pixel 411 to third sub pixel 413 and infrared ray sensor 414 of each pixel 410 through a gate driver 430 and a data driver 420. For example, as illustrated in FIG. 4F, the display device 400 may drive the first sub pixel 411, the infrared ray sensor 414, and a light receiving module 415, to obtain biometric information (e.g., an oxygen saturation, or the like). For example, the display device 400 may apply a power source through the data driver 420 and the gate driver 430, to output red light through the first sub pixel 411 and the infrared ray sensor 414. The display device 400 may collect a light quantity reflected from the human body using the light receiving module 414. The processor 220 may analyze the reflected light quantity collected from the display device 400, to obtain an oxygen saturation of a user. The processor 220 may measure the oxygen saturation of the user using a difference of absorptances of oxyhemoglobin ($HbO_2$) 470 and hemoglobin (Hb) 480.

According to various embodiments of the disclosure, a pixel disposed in the display device 400 may include a sub pixel of red green blue green (RGBG), red green blue yellow (RGBY) or red green blue white (RGBW) as well.

According to various embodiments of the disclosure, the electronic device 201 may include a light emitting module disposed in another region of a substrate, not the display device 250 as well.

According to various example embodiments of the disclosure, an electronic device may include a display configured to include one or more pixels that include a first sub pixel capable of outputting light of a first wavelength range, a second sub pixel capable of outputting light of a second wavelength range, and a third sub pixel capable of outputting light of a third wavelength range, one or more sensors configured to obtain a plurality of biometric information about an external object, and a processor, wherein the processor may be configured to cause the electronic device to: identify first biometric information and second biometric information from among the plurality of biometric information, and output light of first properties through a first pixel set corresponding to the first biometric information among the first sub pixel, the second sub pixel, and the third sub pixel, and obtain the first biometric information using the one or more sensors, and output light of second properties through a second pixel set corresponding to the second biometric information among the first sub pixel, the second sub pixel, and the third sub pixel, and obtain the second biometric information using the one or more sensors.

According to various example embodiments, the processor may be configured to cause the electronic device to control the first pixel set and the second pixel set to output light at mutually different timings.

According to various example embodiments, the processor may be configured to cause the electronic device to output light of the first pixel set through at least one pixel included in a first region of the display device, and output light of the second pixel set through at least one pixel included in a second region of the display device.

According to various example embodiments, at least a part of the one or more pixels included in the display device may further include a light emitting unit comprising light emitting circuitry configured to irradiate light of an infrared band, and the first pixel set may include at least one of the first sub pixel, the second sub pixel, the third sub pixel, and the light emitting unit, and the second pixel set may include at least one different from that of the first pixel set among the first sub pixel, the second sub pixel, the third sub pixel, and the light emitting unit.

According to various example embodiments, the processor may be configured to cause the electronic device to identify authentication on the external object, based on a similarity between designated first information and the first biometric information and/or a similarity between designated second information and the second biometric information.

According to various example embodiments, the processor may be configured to cause the electronic device to identify (determine) an association between the external object and a user of the electronic device, based on the second biometric information.

According to various example embodiments, the processor may be configured to cause the electronic device to identify (determine) authentication on the external object, based on a change pattern of the second biometric information.

According to various example embodiments, the one or more sensors may be disposed in a partial region of the display device, and/or may be disposed in a rear surface of the display device.

According to various example embodiments, the one or more sensors may further include a light converting member comprising light converting circuitry configured to filter light of a predefined wavelength range.

According to various example embodiments, the processor may be configured to cause the electronic device to: output light of first properties through the first pixel set, and obtain a fingerprint image of the external object, based on light reflected from the external object collected through the one or more sensors.

According to various example embodiments, the first pixel set and the second pixel set may be configured to output light of mutually different wavelength ranges.

Figure 5:
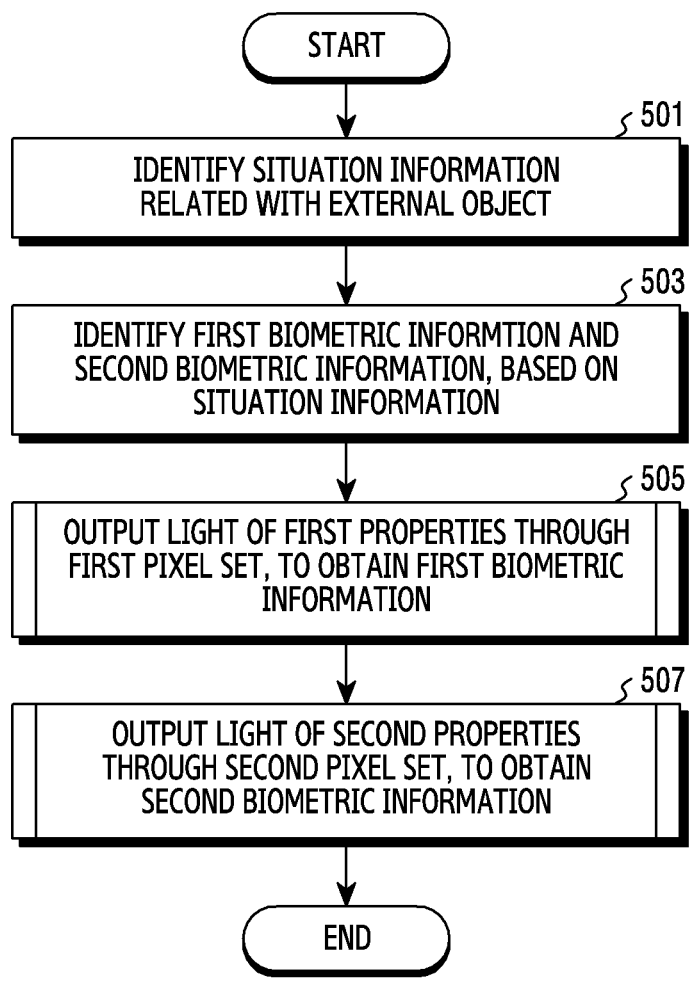
FIG. 5 is a flowchart illustrating a method for obtaining biometric information in an electronic device according to various embodiments of the disclosure.

FIG. 5 is a flowchart illustrating a method for obtaining biometric information in an electronic device according to various embodiments of the disclosure. In the following description, the electronic device may include the electronic device 201 of FIG. 2 or at least a part (e.g., the processor 220) of the electronic device 201.

Referring to FIG. 5, in operation 501, the electronic device (e.g., the electronic device 201 of FIG. 2) may identify situation information related with an external object. For example, the situation information related with the external object may include at least one of proximity or non-proximity of the external object and the electronic device, an application that is being executed in the electronic device at a timing for obtaining biometric information of the external object, and/or a user interface displayed on a display device.

In operation 503, the electronic device may identify first biometric information and second biometric information for obtaining from the external object, based on the situation information related with the external object. For example, in response to the electronic device 201 being in a locking state and the external object making contact with the display device 250, the processor 220 may identify that it obtains a fingerprint image for releasing the locking of the electronic device 201 and information for biometric analysis. For instance, the information for the biometric analysis may include at least one biometric information among a heartbeat, a stress index, an oxygen saturation, a blood pressure, a blood glucose, or a skin tone.

In operation 505, the electronic device may output light of (having) first properties through a first pixel set corresponding to the first biometric information among a plurality of sub pixels included in a pixel, to obtain the first biometric information. For example, referring to FIG. 3A, the processor 220 may control the display device 300 to output light through at least one sub pixel corresponding to the first biometric information among the first sub pixel 312, the second sub pixel 314 and the third sub pixel 316 which are included in the pixel of the display device 300. The processor 220 may obtain the first biometric information using light collected through the light receiving module 318 of the display device 300. As an example, the processor 220 may control the display device 300 to output light of first properties from at least one pixel corresponding to a partial region, which an external object gets in contact with, among the display device 300. As an example, the first properties may include a wavelength of the light output through the first pixel set.

In operation 507, the electronic device may output light of (having) second properties through a second pixel set corresponding to second biometric information among a plurality of sub pixels included in a pixel, to obtain the second biometric information. For example, the second pixel set may include a sub pixel different from that of the first pixel set, and the light of the second properties may include light of a wavelength different from that of the light of the first properties.

According to an embodiment, the electronic device (e.g., the electronic device 201 of FIG. 2) may divide light emitting timings or light emitting regions of the first pixel set and the second pixel set, to obtain the first biometric information and the second biometric information.

According to various example embodiments of the disclosure, the pixel set may include at least one, necessary for obtaining biometric information, among a plurality of sub pixels included in a pixel and light emitting modules (e.g., infrared ray sensors).

Figure 6:
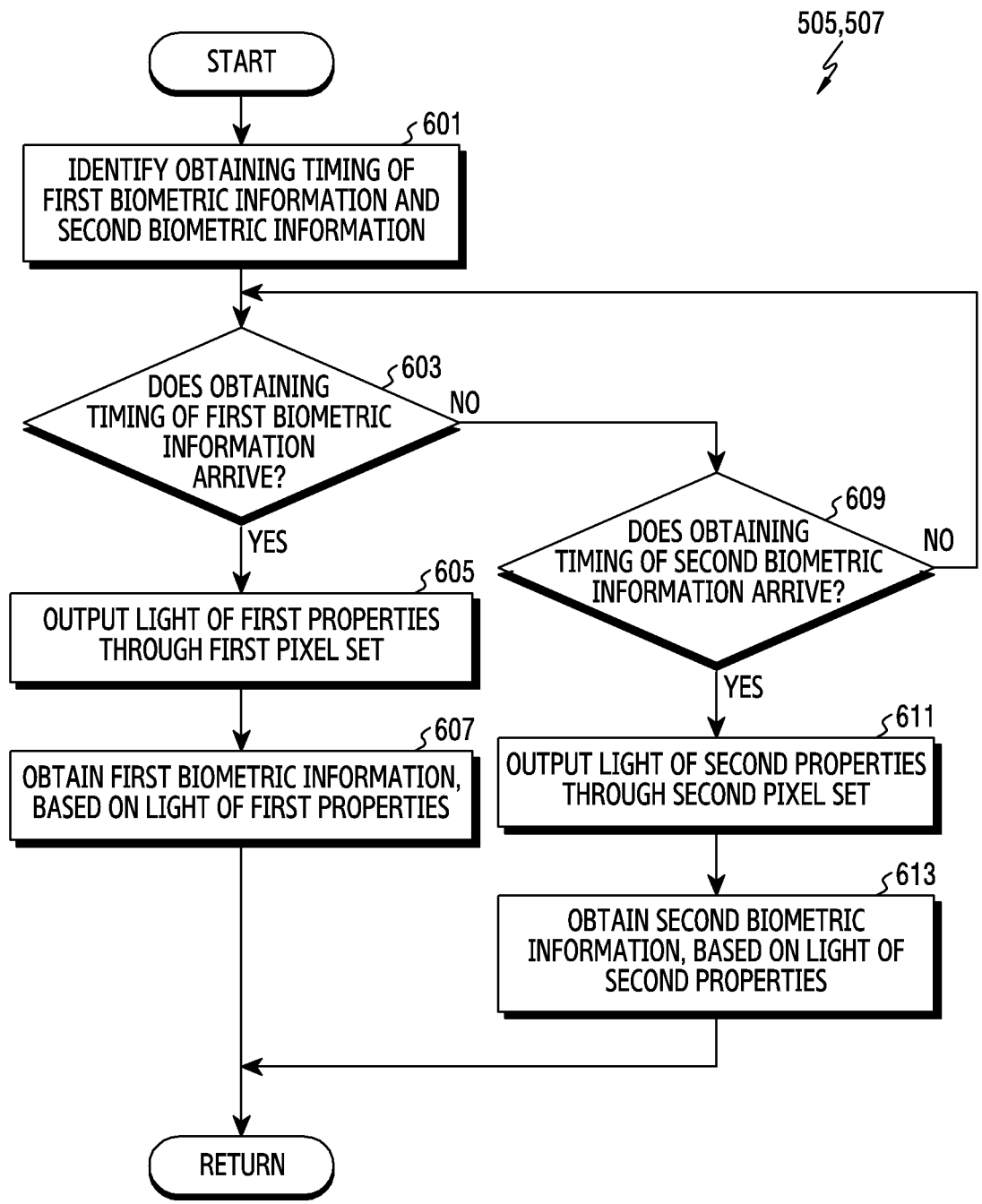
FIG. 6 is a flowchart illustrating a method for dividing a light emitting timing to obtain biometric information in an electronic device according to various embodiments of the disclosure.
Figure 7A:
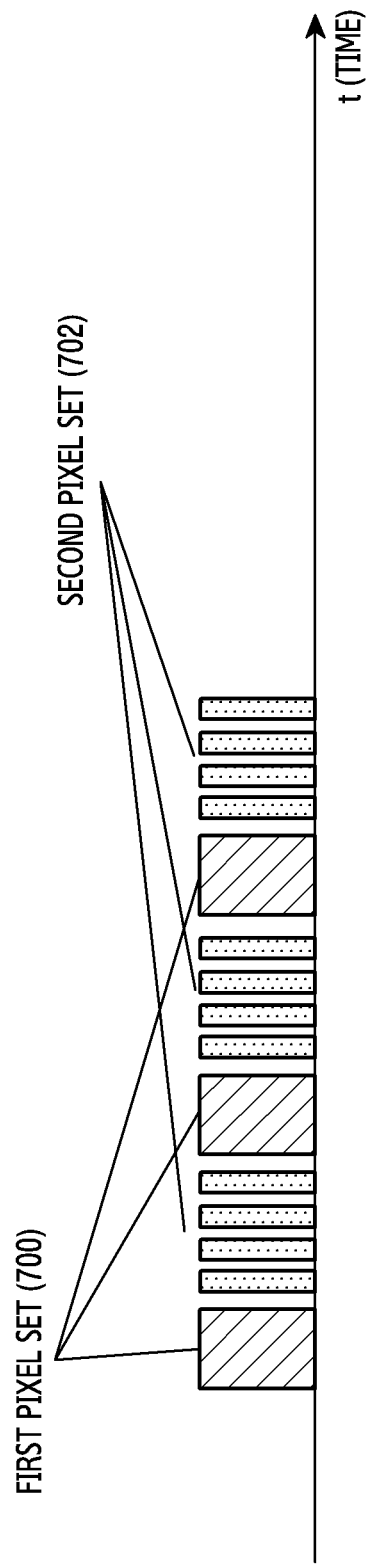
FIGS. 7A and 7B are diagrams illustrating a light emitting timing of a light source for obtaining biometric information in an electronic device according to various embodiments of the disclosure.
Figure 7B:
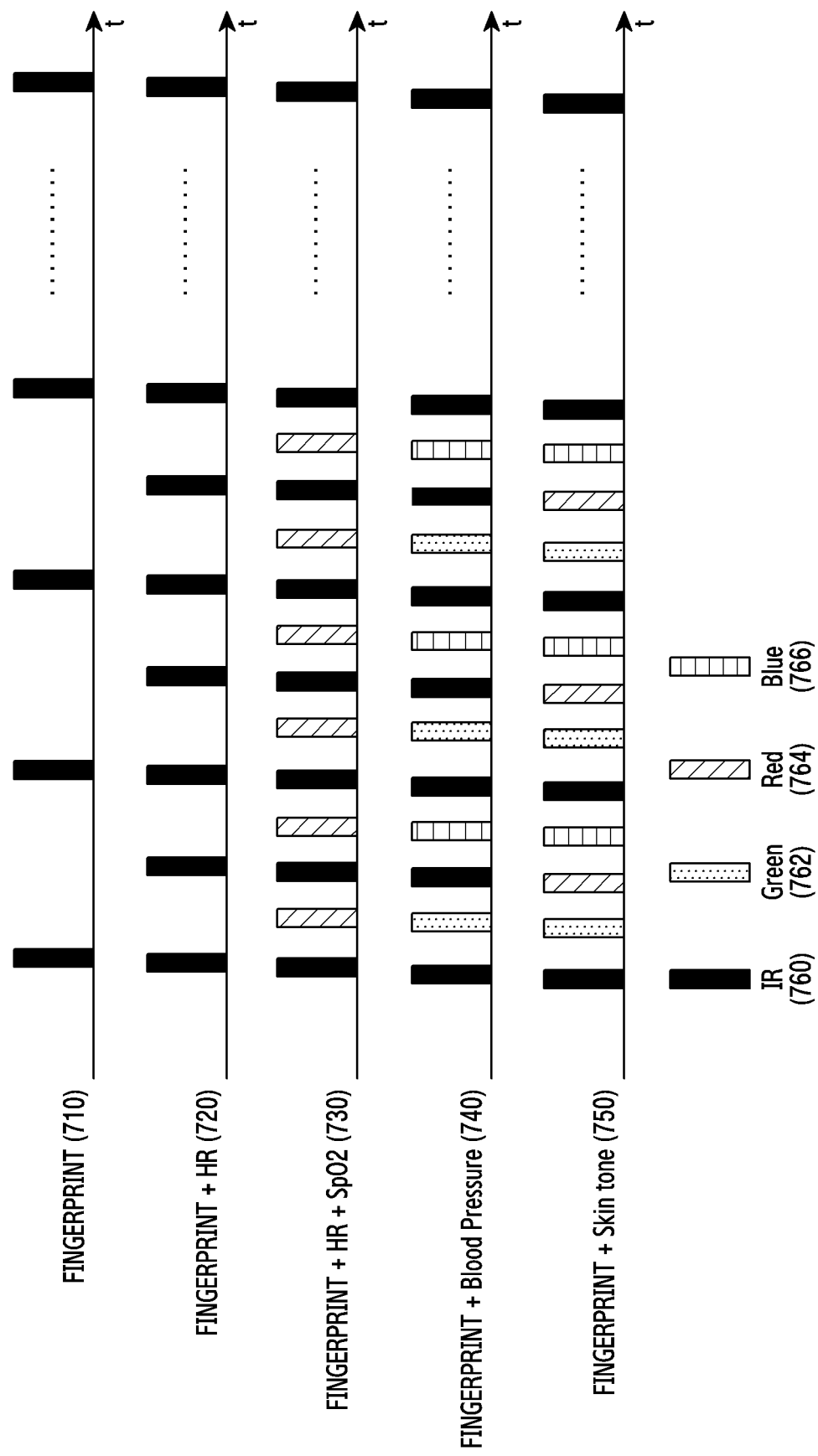

FIG. 6 is a flowchart illustrating a method for dividing a light emitting timing to obtain biometric information in an electronic device according to various embodiments of the disclosure. FIGS. 7A and 7B illustrate a light emitting timing of a light source for obtaining the biometric information in the electronic device according to various embodiments of the disclosure. The following description is made for an operation for obtaining the biometric information using a pixel set corresponding to the biometric information as in operation 505 to operation 507 of FIG. 5. In the following description, the electronic device may include the electronic device 201 of FIG. 2 or at least a part (e.g., the processor 220) of the electronic device 201.

Referring to FIG. 6, in response to identifying biometric information for obtaining from an external object (e.g., operation 503 of FIG. 5), in operation 601, the electronic device (e.g., the electronic device 201) may identify obtaining timings of first biometric information and second biometric information. For example, the processor 220 may identify that the obtaining timings of the first biometric information and the second biometric information are not duplicated within a biometric information obtaining duration. The biometric information obtaining duration may include a time duration for which the external object maintains a contact with the display device 250 for the sake of biometric information obtaining.

In operation 603, the electronic device may identify (determine) whether the obtaining timing of the first biometric information arrives. For example, in response to the external object (e.g., finger) making contact with the display device 250, the processor 220 may identify whether the obtaining timing of the first biometric information (e.g., fingerprint) arrives.

In operation 605, in response to receiving the obtaining timing of the first biometric information, the electronic device may output light of first properties through a first pixel set corresponding to the first biometric information. For example, as illustrated in FIG. 7A, in response to receiving the obtaining timing of the first biometric information (e.g., fingerprint), the processor 220 may control to output the light of the first properties through the first pixel set (e.g., the infrared ray sensor 414 or the first sub pixel 411). As an example, the processor 220 may control to emit light of a first pixel set 700 many times at a given period interval during a biometric information obtaining duration.

In operation 607, the electronic device may collect the light of the first properties reflected from the external object, to obtain the first biometric information. For example, the processor 220 may control the light receiving module 318 of the display device 300 to filter the light of the first properties, based on a timing of outputting the light of the first properties. The processor 220 may collect the light of the first properties reflected from the external object through the light receiving module 318 of the display device 300. As an example, the processor 220 may identify a ridge and valley of a finger, based on a light quantity collected through each pixel. The processor 220 may obtain a fingerprint image by imaging a pattern of the ridge and valley.

In operation 609, in response to the obtaining timing of the first biometric information not arriving, the electronic device may identify (determine) whether the obtaining timing of the second biometric information arrives. For example, in response to the external object (e.g., finger) making contact with the display device 250, the processor 220 may identify whether the obtaining timing of the second biometric information (e.g., biometric signal pulse) arrives.

In response to the obtaining timing of the second biometric information not arriving, in operation 603, the electronic device may again identify whether the obtaining timing of the first biometric information arrives.

In operation 611, in response to receiving the obtaining timing of the second biometric information, the electronic device may output light of second properties through a second pixel set corresponding to the second biometric information. For example, as illustrated in FIG. 7A, in response to receiving the obtaining timing of the second biometric information (e.g., biometric signal pulse), the processor 220 may control to output the light of the second properties through the second pixel set (e.g., the second sub pixel 412). As an example, the processor 220 may control to emit light of the second pixel set 702 many times at a given period interval during the biometric information obtaining duration. As an example, the first pixel set 700 and the second pixel set 702 may output light of a wavelength at which an influence of a mutual interference is relatively lower. For instance, red output from the first sub pixel 411 and an infrared ray output from the infrared ray sensor 414 may have a relatively larger influence of mutual interference because light wavelengths are adjacent with each other. Accordingly to this, the first sub pixel 411 and the infrared ray sensor 414 may be limited in setting as the first pixel set 700 and the second pixel set 702. For instance, green output from the second sub pixel 412 and infrared ray output from the infrared ray sensor 414 may have a relatively lower influence of mutual interference because a superposed band is less. Accordingly to this, the second sub pixel 412 and the infrared ray sensor 414 may be set as the first pixel set 700 and the second pixel set 702.

In operation 613, the electronic device may collect (obtain) light of second properties reflected from the external object, to obtain second biometric information. For example, the processor 220 may control the light receiving module 318 of the display device 300 to filter the light of the second properties, based on a timing of outputting the light of the second properties. The processor 220 may collect the light of the second properties reflected from the external object through the light receiving module 318 of the display device 300, based on a timing of outputting the light of the second properties. As an example, the processor 220 may obtain a biometric signal pulse (e.g., photoplethysmography (PPG)) that is a variable component dependent on a blood flow rate, based on a light quantity collected through each pixel. As an example, the processor 220 may calculate a heart rate per minute, based on a peak-to-peak time of a biometric signal pulse quantized in a time domain.

According to an example embodiment, the electronic device (e.g., the electronic device 201) may adjust a sampling rate for obtaining biometric information, to obtain a plurality of biometric information. For example, as illustrated in FIG. 7B, in response to obtaining a fingerprint (710), the processor 220 may control an infrared ray sensor 760 to output light, based on a fingerprint obtaining timing. The processor 220 may collect light (infrared ray) reflected from an external object, to obtain a fingerprint image. As an example, in response to additionally obtaining a heartbeat (720), the processor 220 may control the infrared ray sensor 760 to additionally output light, based on a heartbeat obtaining timing having been set between the fingerprint obtaining timings. The processor 220 may collect light (infrared ray) reflected from an external object between the fingerprint obtaining timings, to additionally obtain heartbeat information. As an example, in response to additionally obtaining an oxygen saturation (730), the processor 220 may control a first sub pixel 764 to output light, based on an oxygen saturation obtaining timing having been set between the fingerprint obtaining timing and the heartbeat obtaining timing. The processor 220 may collect light (red) reflected from the external object between the fingerprint obtaining timing and the heartbeat obtaining timing, to additionally obtain the oxygen saturation. As an example, in response to additionally obtaining a blood pressure (740), the processor 220 may control a second sub pixel 762, the infrared ray sensor 760 and a third sub pixel 766 to sequentially output light, based on a blood pressure obtaining timing having been set between the fingerprint obtaining timings. The processor 220 may collect light reflected from the external object between the fingerprint obtaining timings, to additionally obtain the blood pressure. As an example, in response to additionally obtaining a skin tone (750), the processor 220 may control the second sub pixel 762, the first sub pixel 764 and the third sub pixel 766 to sequentially output light, based on a skin tone obtaining timing having been set between the fingerprint obtaining timings. The processor 220 may collect light reflected from the external object between the fingerprint obtaining timings, to additionally obtain the skin tone.

Figure 8:
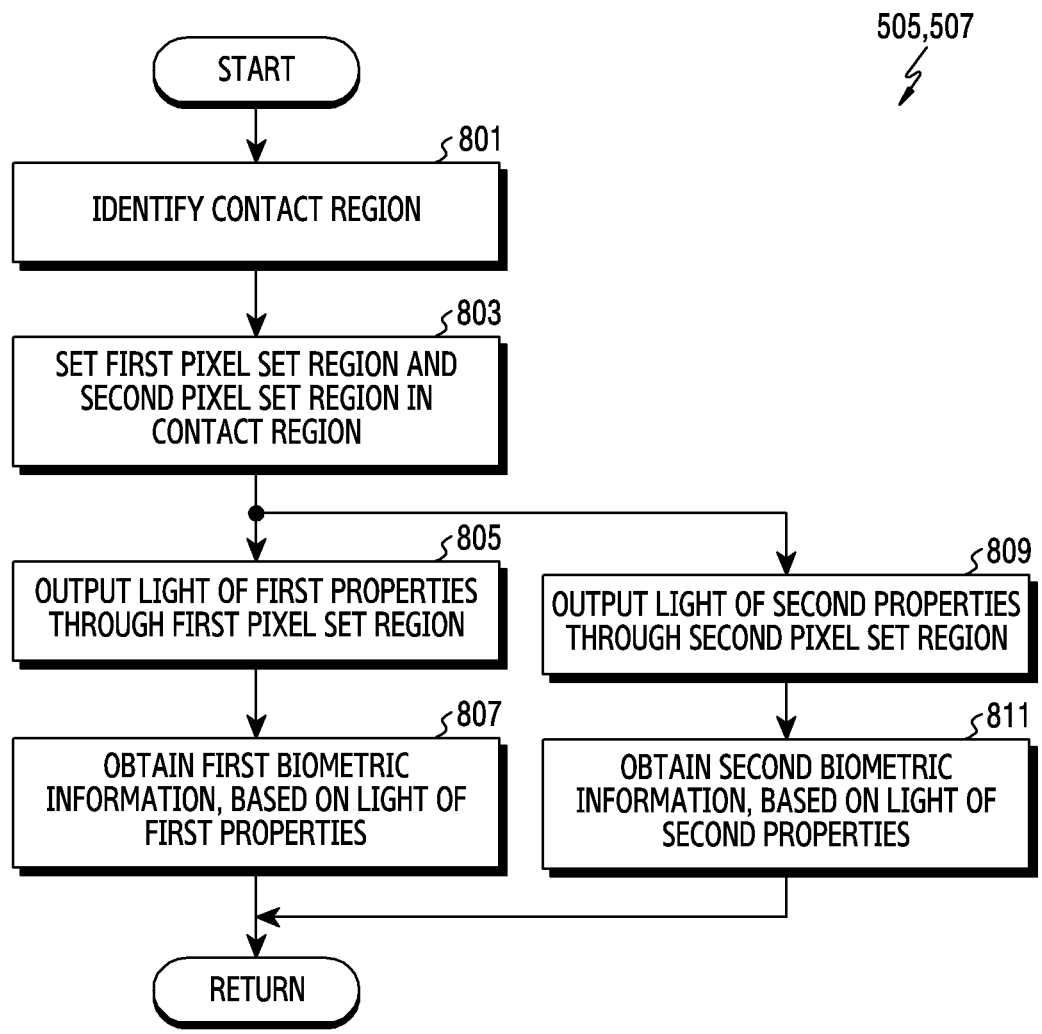
FIG. 8 is a flowchart illustrating a method for dividing a light emitting region to obtain biometric information in an electronic device according to various embodiments of the disclosure.
Figure 9:
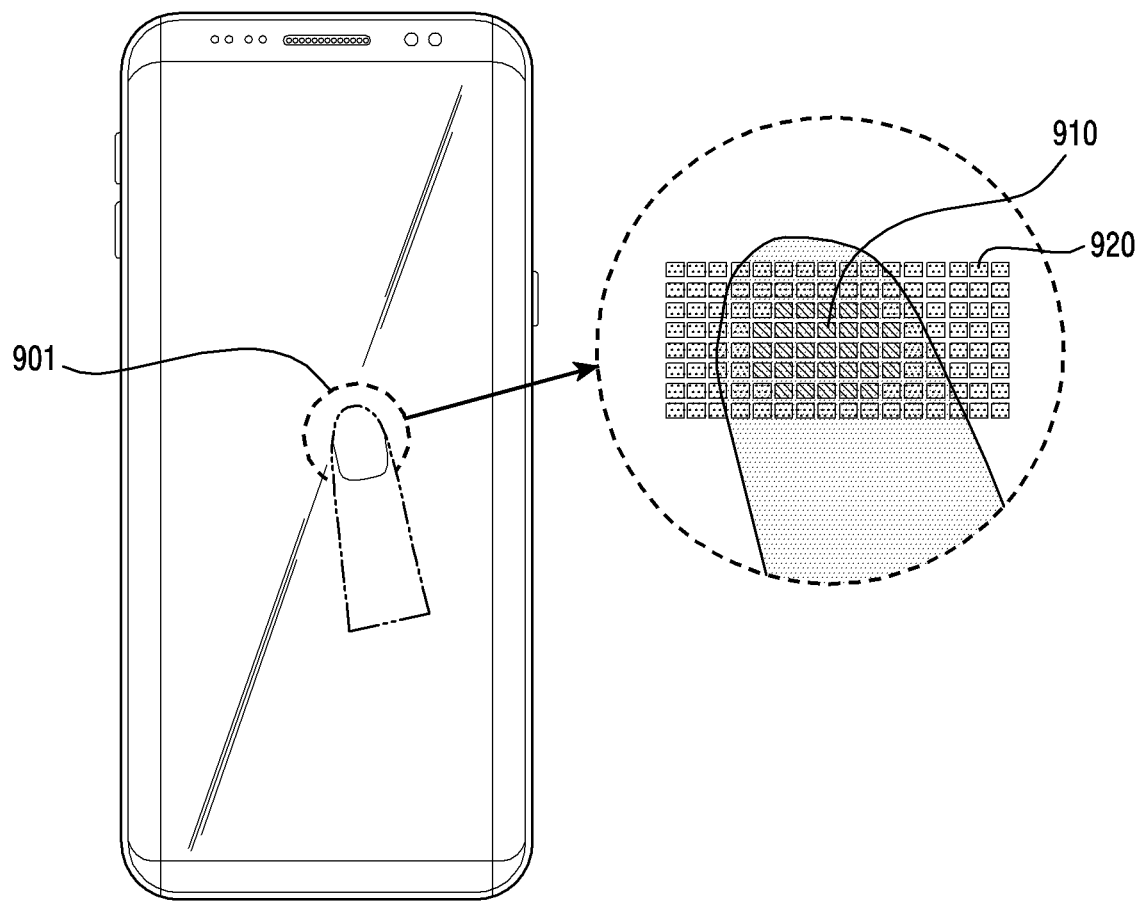
FIG. 9 is a diagram illustrating a light emitting region for obtaining biometric information in an electronic device according to various embodiments of the disclosure.

FIG. 8 is a flowchart illustrating a method for dividing a light emitting region to obtain biometric information in an electronic device according to various embodiments of the disclosure. FIG. 9 is a diagram illustrating the light emitting region for obtaining the biometric information in the electronic device according to various embodiments of the disclosure. The following description is provided for an operation for obtaining biometric information using a pixel set corresponding to the biometric information as in operation 505 to operation 507 of FIG. 5. In the following description, the electronic device may include the electronic device 201 of FIG. 2 or at least a part (e.g., the processor 220) of the electronic device 201.

Referring to FIG. 8, in operation 801, in response to identifying biometric information for obtaining from an external object (e.g., operation 503 of FIG. 5), the electronic device (e.g., the electronic device 201) may identify a contact region of the external object related with a display device (e.g., the display device 250). For example, the processor 220 may identify a region 901 which a finger gets in contact with among the display device 250.

In operation 803, the electronic device may set a region of a first pixel set corresponding to first biometric information and a region of a second pixel set corresponding to second biometric information in the contact region. For example, the processor 220 may set at least a partial region 910 corresponding to a center of the contact region 901, as the region of the first pixel set. The processor 220 may set the remnant region 920 excepting the region of the first pixel set among the contact region 901, as the region of the second pixel set.

In operation 805, the electronic device may output light of first properties through the first pixel set among light sources included in at least one pixel included in the region of the first pixel set. For example, the processor 220 may control a light source of the first pixel set to output the light of the first properties from the region 910 of the first pixel set.

In operation 807, the electronic device may collect the light of the first properties reflected from an external object, to obtain the first biometric information. For example, the processor 220 may identify to obtain the first biometric information through at least one pixel included in the region 910 of the first pixel set. The processor 220 may control the display device 250 to collect the light of the first properties reflected from the external object by filtering the light of the first properties in at least one pixel included in the region 910 of the first pixel set.

In operation 809, the electronic device may output light of second properties through the second pixel set among light sources included in at least one pixel included in the region of the second pixel set. For example, the processor 220 may control a light source of the second pixel set to output the light of the second properties from the region 920 of the second pixel set. As an example, the region 920 of the second pixel set may output light of properties (e.g., wavelength) different from the first properties (e.g., wavelength) corresponding to the first pixel set, at the same timing as that of the region 910 of the first pixel set.

In operation 811, the electronic device may collect the light of the second properties reflected from the external object, to obtain second biometric information. For example, the processor 220 may control the display device 250 to collect the light of the second properties reflected from the external object by filtering the light of the second properties in at least one pixel included in the region 920 of the second pixel set.

Figure 10:
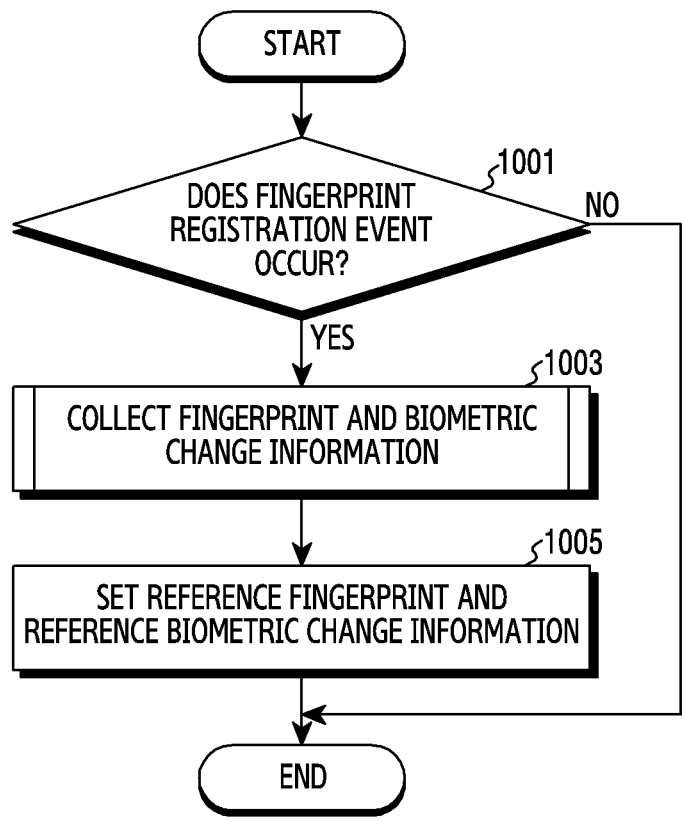
FIG. 10 is a flowchart illustrating a method for registering biometric information in an electronic device according to various embodiments of the disclosure.
Figure 11:
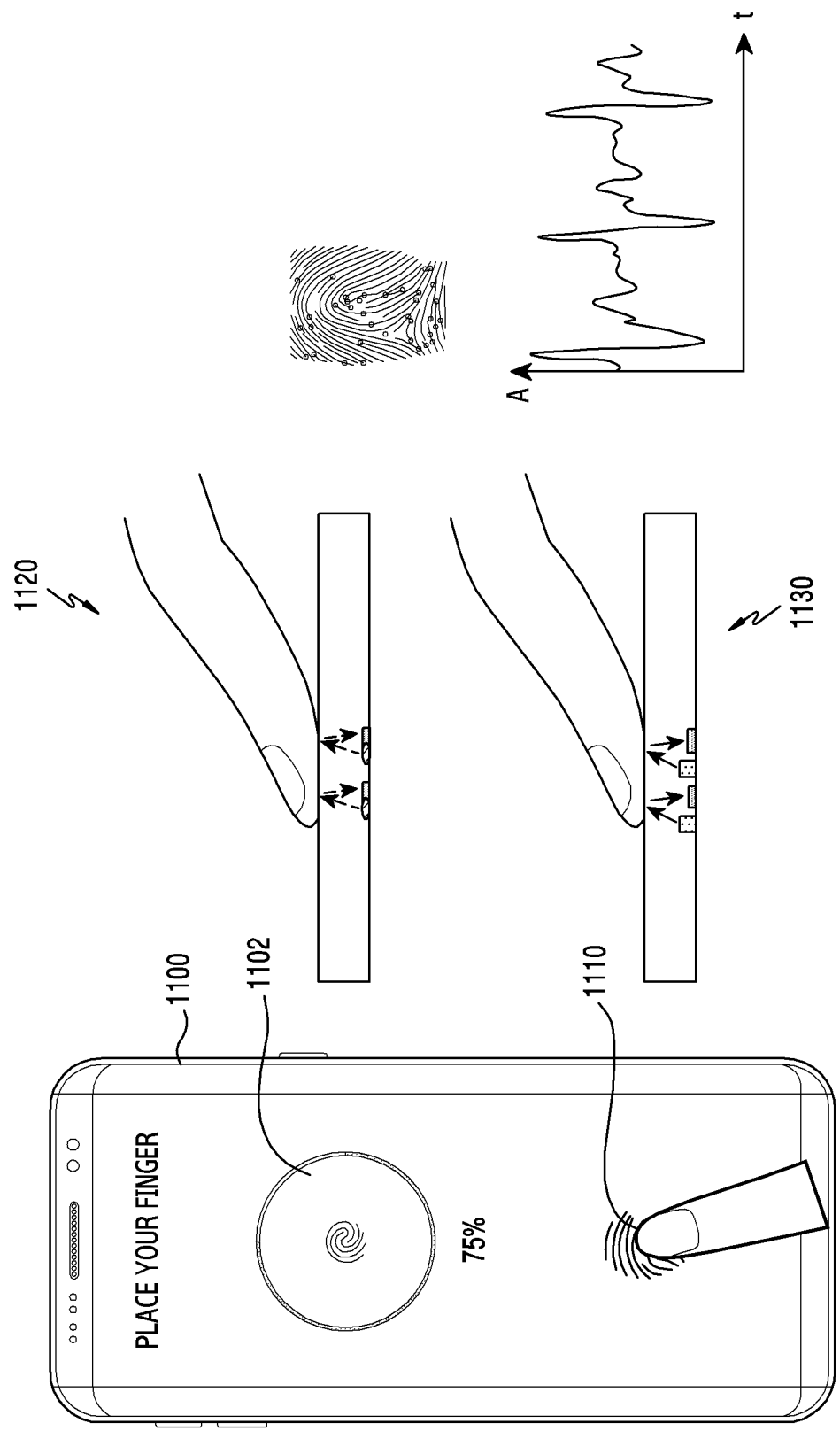
FIG. 11 is a diagram illustrating a structure for registering biometric information in an electronic device according to various embodiments of the disclosure.

FIG. 10 is a flowchart illustrating an example method for registering biometric information in an electronic device according to various embodiments of the disclosure. FIG. 11 is a diagram illustrating a structure for registering the biometric information in the electronic device according to various embodiments of the disclosure. In the following description, the electronic device may include the electronic device 201 of FIG. 2 or at least a part (e.g., the processor 220) of the electronic device 201.

Referring to FIG. 10, in operation 1001, the electronic device (e.g., the electronic device 201 of FIG. 2) may identify (determine) whether a fingerprint registration event occurs. For example, the processor 220 may identify whether a fingerprint registration menu is selected, based on a user input received through the input output interface 240. As an example, in response to the fingerprint registration event taking place, as illustrated in FIG. 11, the processor 220 may control the display device 250 to display a user interface 1100 for fingerprint registration. The user interface 1100 for fingerprint registration may include a fingerprint registration rate 1102.

In operation 1003, in response to the fingerprint registration event taking place, the electronic device may obtain (collect) fingerprint and biometric change information about an external object that makes contact with a display device (e.g., the display device 250). For example, as in operation 501 to operation 507 of FIG. 5, the processor 220 may output light through a mutually different pixel set, to obtain fingerprint image and biometric change information. As an example, as illustrated in FIG. 11, in response to a finger 1110 making contact with the display device 250, the processor 220 may control to output light of a first pixel set (e.g., the infrared ray sensor 414 or the first sub pixel 411) corresponding to a fingerprint, to obtain a fingerprint image (1120). The processor 220 may control to output light of a second pixel set (e.g., the second sub pixel 412) corresponding to biometric change information, to obtain a biometric signal pulse (e.g., PPG) that is an alternating current (AC) component dependent on a blood flow rate of the human body (1130). As an example, the first pixel set and the second pixel set may emit light at mutually different timings as illustrated in FIG. 7A, or emit light in mutually different regions as illustrated in FIG. 9.

In operation 1005, the electronic device may set the reference fingerprint and reference biometric change information about the external object, as reference fingerprint and reference biometric change information for user authentication. For example, the processor 220 may set a fingerprint image obtained by outputting the light of the first properties, as a fingerprint template for user authentication, and set the biometric change information obtained by outputting the light of the second properties, as a biometric information template for additional user authentication. The processor 220 may control the memory 230 to associate and store a reference fingerprint image for user authentication and reference biometric change information for additional user authentication.

According to an embodiment, in response to storing biometric information templates for authentication on various users, the electronic device (e.g. the electronic device 201) may associate and store a reference fingerprint image and reference biometric change information on a per-user basis.

Figure 12:
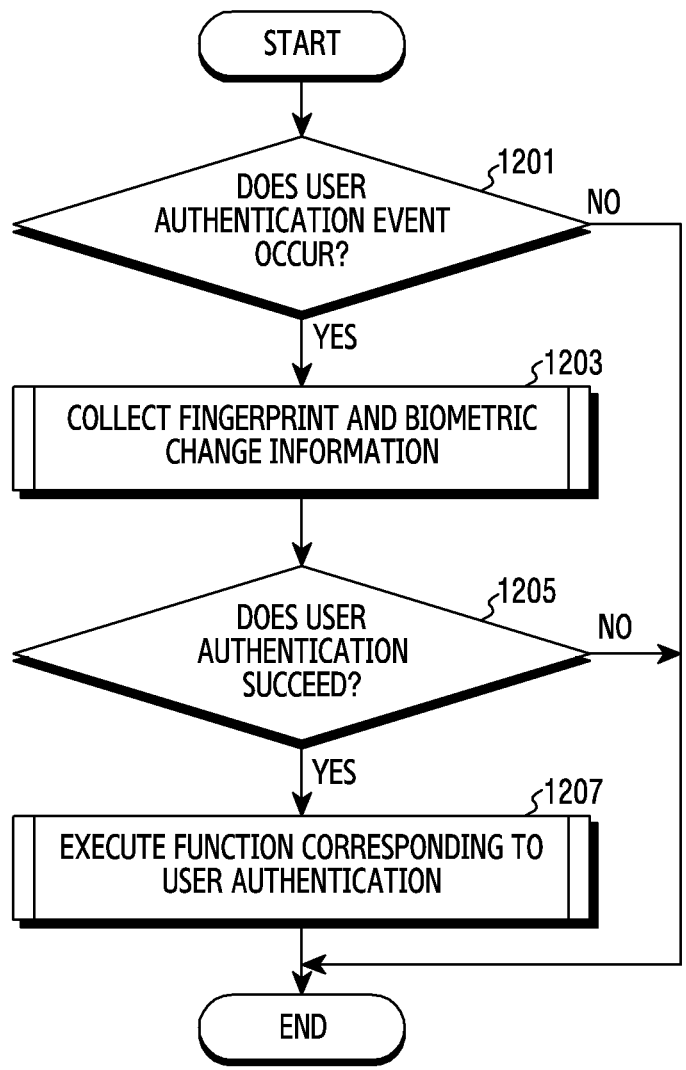
FIG. 12 is a flowchart illustrating a method for authenticating a user using biometric information in an electronic device according to various embodiments of the disclosure.
Figure 13:
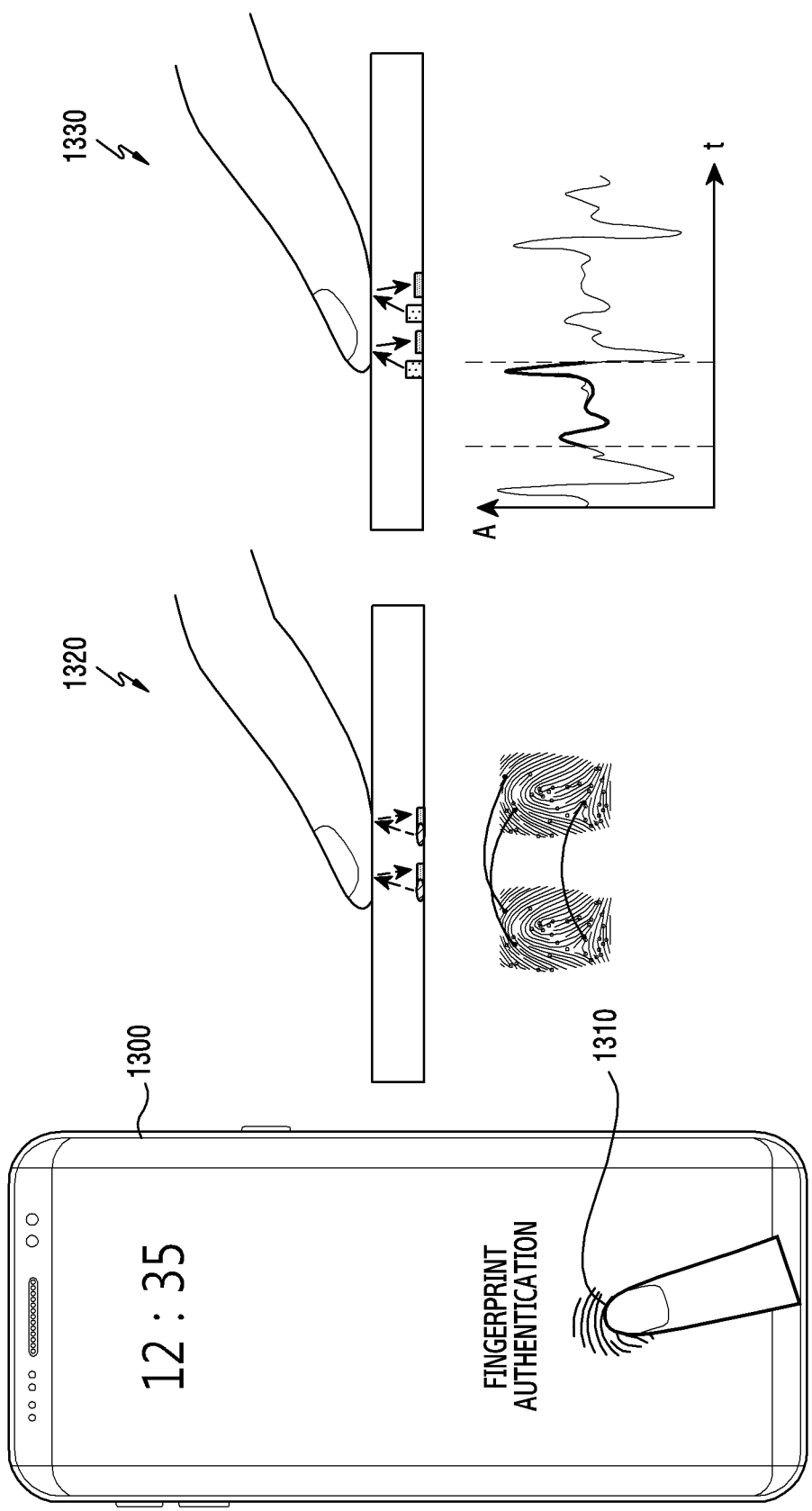
FIG. 13 is a diagram illustrating a structure for obtaining biometric information for user authentication in an electronic device according to various embodiments of the disclosure.

FIG. 12 is a flowchart illustrating a method for authenticating a user using biometric information in an electronic device according to various embodiments of the disclosure. FIG. 13 is a diagram illustrating a structure for obtaining biometric information for user authentication in the electronic device according to various embodiments of the disclosure. In the following description, the electronic device may include the electronic device 201 of FIG. 2 or at least a part (e.g., the processor 220) of the electronic device 201.

Referring to FIG. 12, in operation 1201, the electronic device (e.g., the electronic device 201 of FIG. 2) may identify (determine) whether a user authentication event occurs. For example, the processor 220 may determine whether an event for locking release takes place, based on a user input received through the input output interface 240. For example, the processor 220 may determine whether an event for electronic payment takes place, based on a user input received through the input output interface 240. As an example, in response to the user authentication event taking place, as illustrated in FIG. 13, the processor 220 may control the display device 250 to display a user interface 1300 for biometric information input.

In operation 1203, in response to the user authentication event taking place, the electronic device may obtain fingerprint and biometric change information about an external object that makes contact with a display device (e.g., the display device 250). For example, as in operation 501 to operation 507 of FIG. 5, the processor 220 may output light of mutually different properties, to obtain fingerprint image and biometric change information. The light of the mutually different properties may be output through mutually different pixel sets. As an example, as illustrated in FIG. 13, in response to a finger making contact with the display device 250 (1310), the processor 220 may control the electronic device to output light of a first pixel set (e.g., the infrared ray sensor 414 or the first sub pixel 411) corresponding to a fingerprint, to obtain a fingerprint image (1320). The processor 220 may control to output light of a second pixel set (e.g., the second sub pixel 412) corresponding to biometric change information, to obtain a biometric signal pulse (e.g., PPG) (1330). As an example, the first pixel set and the second pixel set may emit light at mutually different timings, or output light of mutually different properties (e.g., wavelengths) in mutually different regions.

In operation 1205, the electronic device may identify (determine) whether it has succeeded in user authentication, based on the fingerprint and biometric change information about the external object. For example, the processor 220 may compare the fingerprint image obtained by outputting the light of the first properties and a reference fingerprint image stored in the memory 230. In response to a similarity between the fingerprint image and the reference fingerprint image exceeding a reference similarity, the processor 220 may determine that the fingerprint image and the reference fingerprint image are consistent with each other. The processor 220 may analyze a correlation between the biometric change information obtained by outputting the light of the second properties and reference biometric change information stored in the memory 230. In response to it being identified that the fingerprint image and the reference fingerprint image are consistent with each other, and the biometric change information and the reference biometric change information are matched with each other, the processor 220 may determine that the user authentication has succeeded. In response to it being determined that the fingerprint image and the reference fingerprint image are not consistent with each other, and the biometric change information and the reference biometric change information are not matched with each other, the processor 220 may determine that the user authentication has failed.

In response to it being determined that the user authentication has failed, the electronic device may determine that an execution of a function corresponding to the user authentication is restricted. As an example, the processor 220 may control at least one of the input output interface 240 or the display device 250 to output authentication failure information.

In operation 1207, in response to succeeding in the user authentication, the electronic device may execute the function corresponding to the user authentication. For example, in response to succeeding in the user authentication, the processor 220 may release the locking of the electronic device 201.

According to various embodiments of the disclosure, in response to succeeding in the user authentication, the electronic device may refine the reference fingerprint image and reference biometric change information stored in the memory 230, based on the fingerprint image and biometric change information obtained in operation 1203 of FIG. 12.

Figure 14:
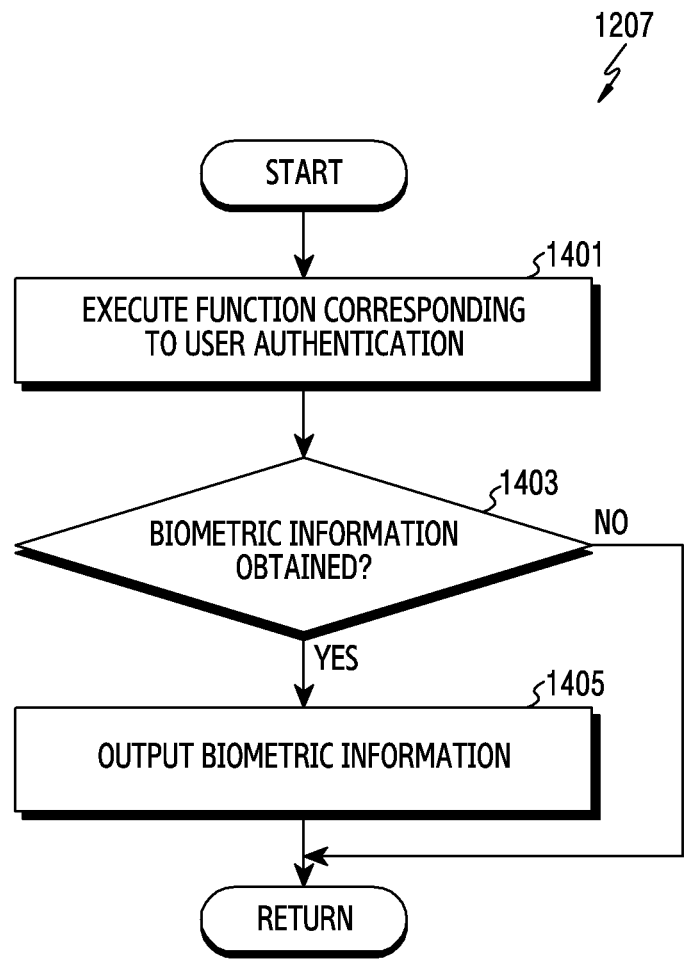
FIG. 14 is a flowchart illustrating a method for outputting biometric information in an electronic device according to various embodiments of the disclosure.

FIG. 14 is a flowchart illustrating a method for outputting biometric information in an electronic device according to various embodiments of the disclosure. The following description is made for an operation for executing a function corresponding to user authentication as in operation 1207 of FIG. 12. In the following description, the electronic device may include the electronic device 201 of FIG. 2 or at least a part (e.g., the processor 220) of the electronic device 201.

Referring to FIG. 14, in operation 1401, in response to succeeding in user authentication using a plurality of biometric information (e.g., operation 1205 of FIG. 12), the electronic device may execute a function corresponding to the user authentication. For example, in response to succeeding in the user authentication, the processor 220 may activate an electronic payment service.

In operation 1403, the electronic device may identify (determine) whether it may obtain biometric information of a user using biometric change information. For example, as in operation 1203 of FIG. 12, the processor 220 may analyze a PPG obtained at a fingerprint obtaining timing, to determine whether it may obtain the biometric information of the user such as a heartbeat, an oxygen saturation, a stress index, etc.

In operation 1405, in response to obtaining the biometric information of the user using the biometric change information, the electronic device may output the biometric information of the user. For example, the processor 220 may control the display device 250 to display the biometric information of the user (e.g., a heartbeat, an oxygen saturation, etc.) obtained using the biometric change information. For example, the processor 220 may identify a user's body state, based on the biometric information of the user obtained using the biometric change information. In response to identifying that the user's body state is out of a normal range, the processor 220 may control the display device 250 or the input output interface 240 to output a warning message or warning sound.

Figure 15A:
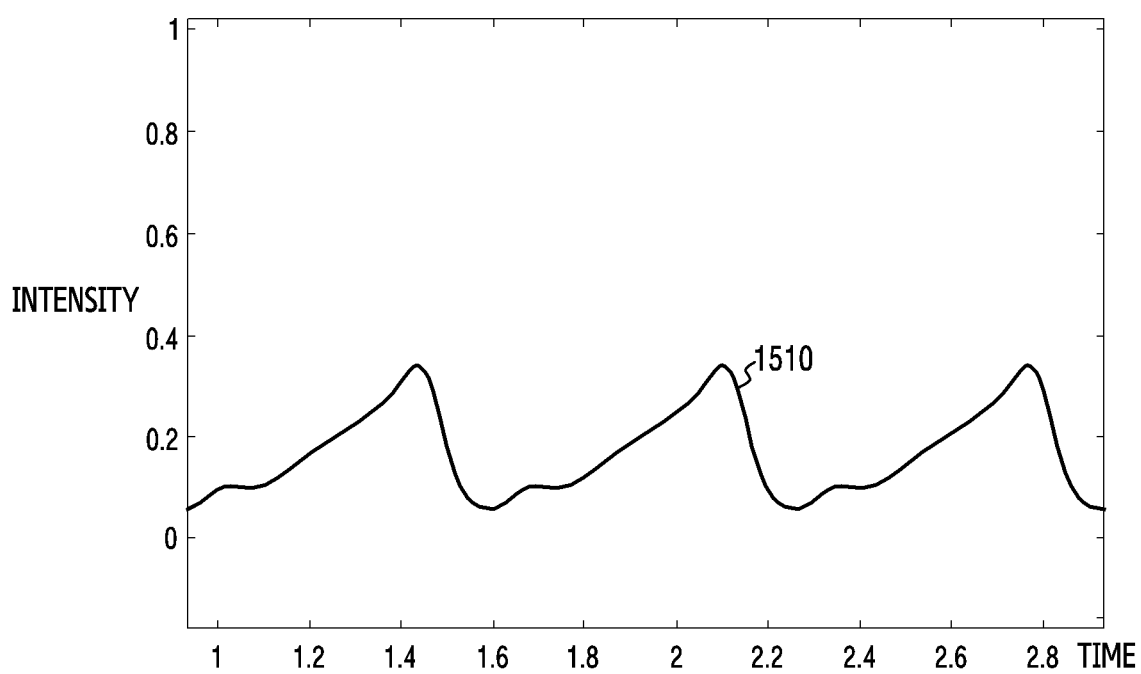
FIGS. 15A, 15B and 15C are graphs illustrating biometric information obtained in an electronic device according to various embodiments of the disclosure.
Figure 15B:
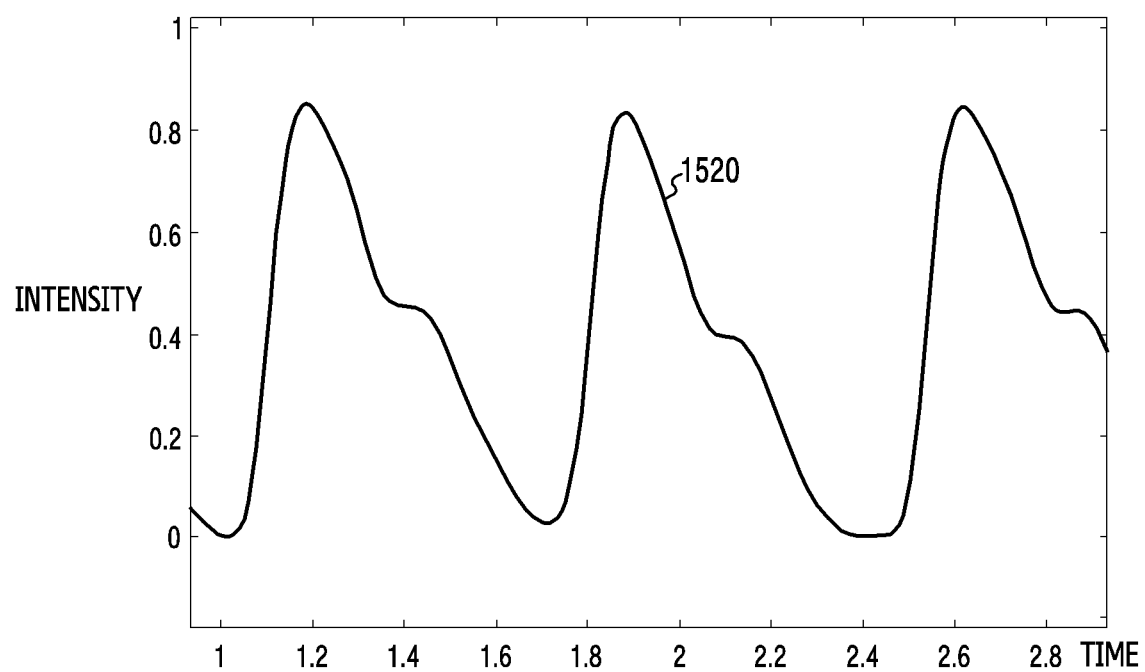
Figure 15C:
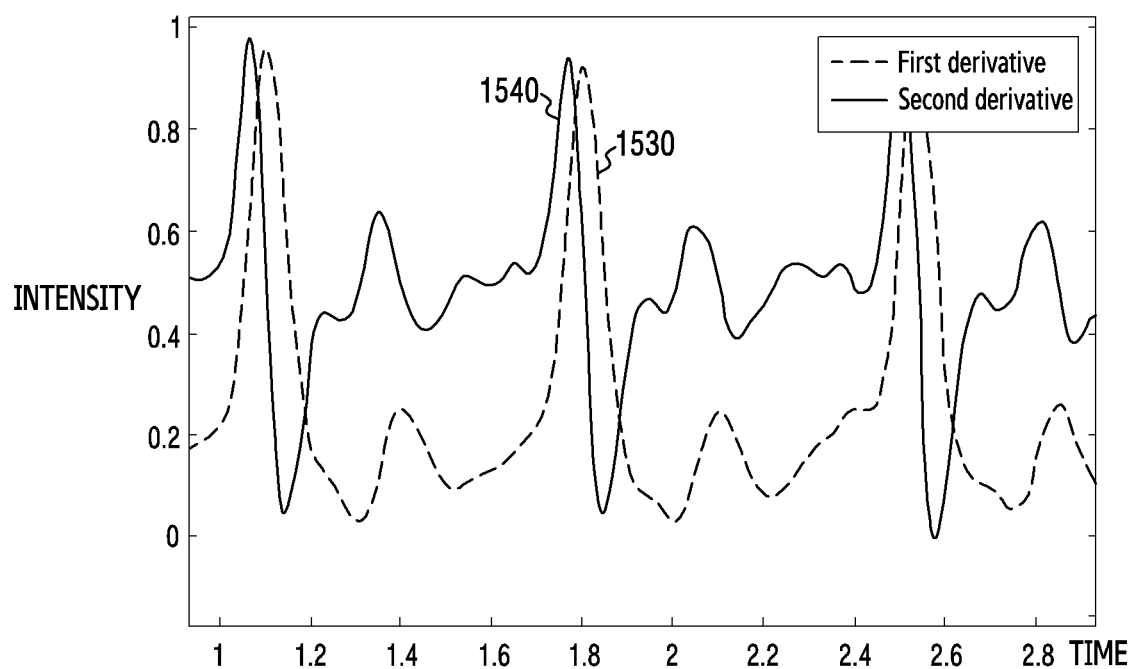
Figure 16A:
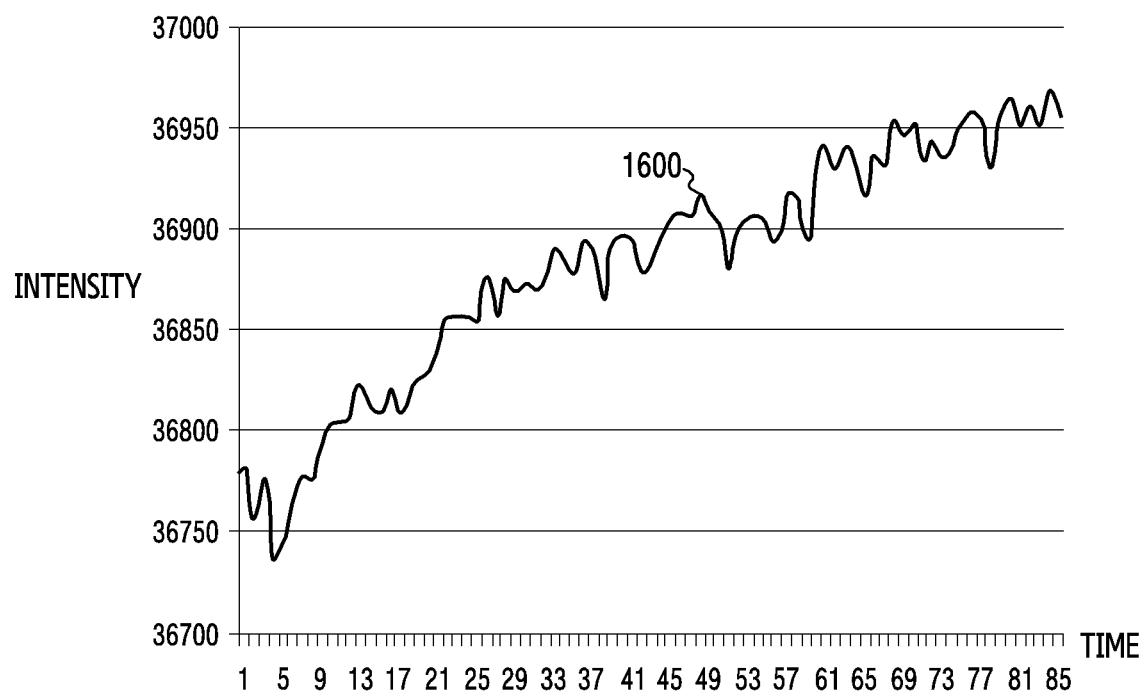
FIGS. 16A and 16B are graphs illustrating another example of biometric information obtained in an electronic device according to various embodiments of the disclosure.
Figure 16B:
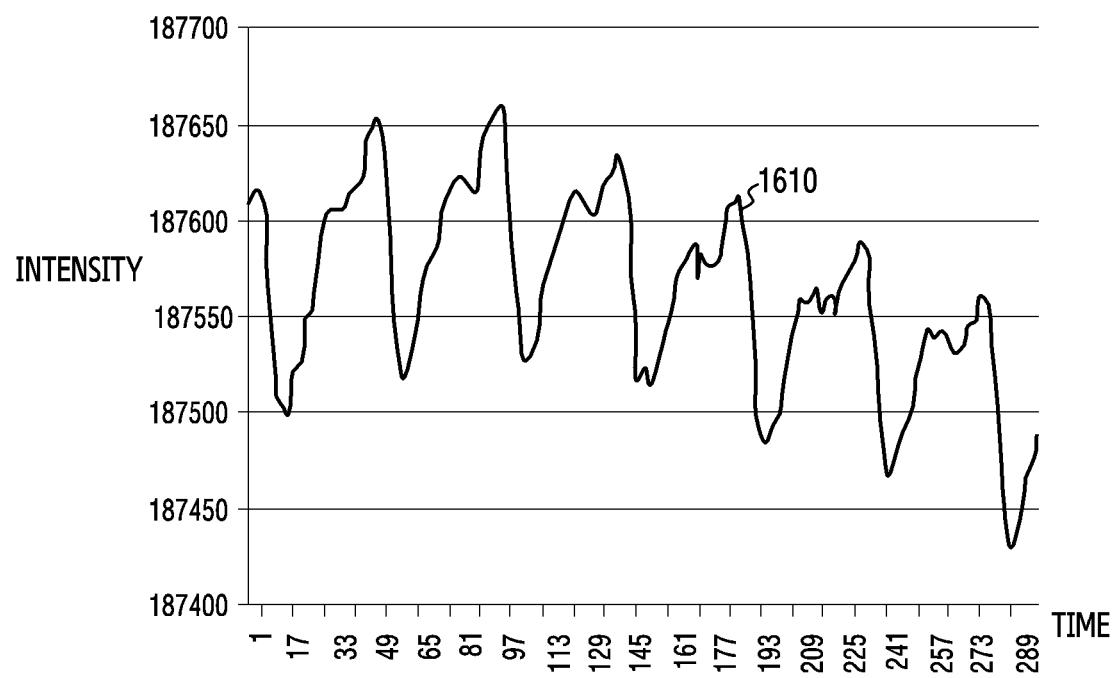
Figure 17A:
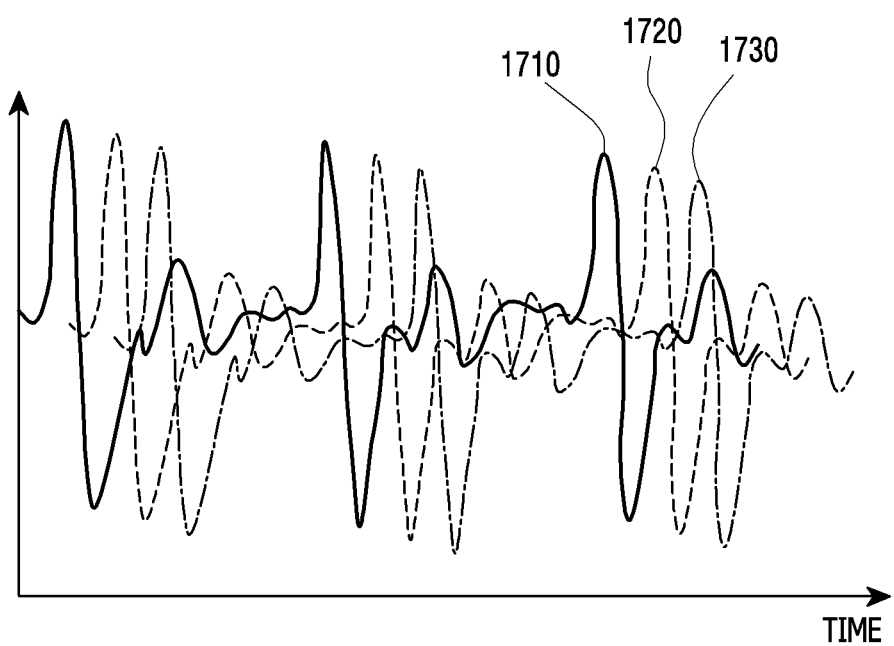
FIGS. 17A and 17B are graphs illustrating a further example of biometric information obtained in an electronic device according to various embodiments of the disclosure.
Figure 17B:
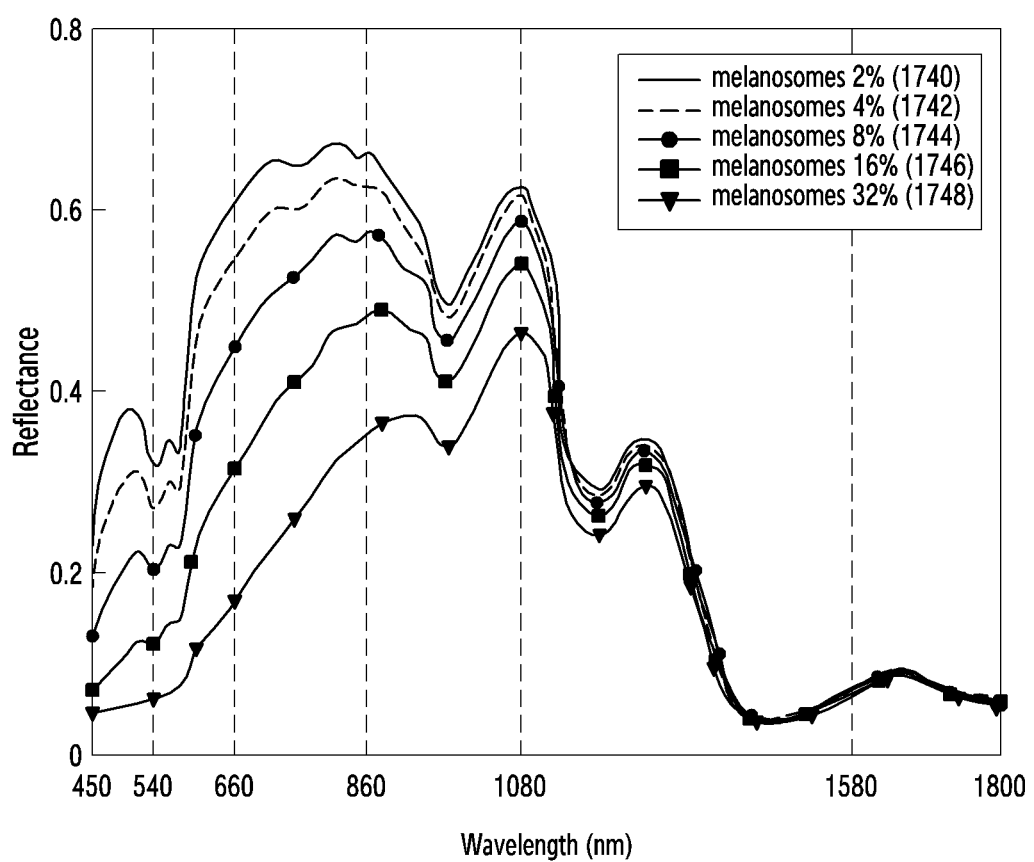

FIGS. 15A, 15B and 15C are graphs illustrating biometric information obtained in an electronic device according to various embodiments of the disclosure. FIGS. 16A and 16B are graphs illustrating another example of biometric information obtained in the electronic device according to various embodiments of the disclosure. FIGS. 17A and 17B are graphs illustrating a further example of a graph of biometric information obtained in the electronic device according to various embodiments of the disclosure.

According to an embodiment, the electronic device 201 may improve a security level of fingerprint authentication, using biometric change information (e.g., PPG) obtained together with a fingerprint image.

According to an embodiment, the electronic device 201 may analyze a correlation of biometric change information, based on a waveform of the biometric change information. For example, as illustrated in FIGS. 15A, 15B and 15C, an AC component (e.g., PPG) dependent on a user's blood flow rate may include a waveform 1510 or 1520 which are different mutually every user. According to this, as illustrated in FIG. 15C, the processor 220 may compare a waveform of biometric change information 1540 obtained by emitting light through a pixel set and reference biometric change information 1530 stored in the memory 230, to identify the matching or non-matching of the biometric change information. As an example, the waveform of the biometric change information may include at least one of an angle, width, height, region or cycle of a biometric change signal.

According to an embodiment, the electronic device 201 may obtain biometric change information (PPG) of one or more cycles during a time for obtaining a fingerprint image. In response to obtaining the biometric change information of one or more cycles, the electronic device 201 may obtain a waveform of the biometric change information dependent on a position of a peak component included in the measured biometric change information, to analyze a correlation with reference biometric change information.

According to an embodiment, the electronic device 201 may adaptively apply a matching score of the biometric change information, based on a security level for user authentication. For example, the matching score of the biometric change information may include, as a feature, the biometric change information for analyzing the correlation with the reference biometric change information for the purpose of the user authentication. As an example, the processor 220 may set a matching score of the biometric change information higher as the security level for the user authentication is higher.

According to an embodiment, the electronic device 201 may identify an association (e.g., the contact or non-contact of the user's human body) between the electronic device 201 and an external object, based on a pattern of biometric change information. For example, in response to the user's human body not making contact with the display device 250, as illustrated in FIG. 16A, the processor 220 may obtain a signal 1600 of a waveform including a white noise. In response to the user's human body making contact with the display device 250, as illustrated in FIG. 16B, the processor 220 may obtain a signal 1610 of a given pattern. According to this, in response to obtaining the signal 1600 of the waveform including the white noise as illustrated in FIG. 16A, the processor 220 may identify (determine) that a fingerprint image has been cloned. That is, the processor 220 may identify (determine) that user authentication using the fingerprint image has failed. In response to obtaining the signal 1610 including the waveform of the given pattern as illustrated in FIG. 16B, the processor 220 may identify (determine) that it has obtained a fingerprint image from the user's human body. That is, in response to succeeding in authenticating the fingerprint image, the processor 220 may identify (determine) that the user authentication has succeeded.

According to an embodiment, the electronic device 201 may identify an association (e.g., the contact or non-contact of the user's human body) between the electronic device 201 and an external object, based on patterns of biometric change information corresponding to several wavelengths. For example, the processor 220 may obtain AC components (PPG) of several wavelengths reflected from the external object making contact with the display device 250. In response to waveforms of AC components 1710, 1720 and 1730 of several wavelengths being similar with one another as illustrated in FIG. 17A, the processor 220 may identify (determine) that the user's human body gets in contact with the display device 250. That is, in response to succeeding in authenticating the fingerprint image, the processor 220 may identify (determine) that the user authentication has succeeded.

According to an embodiment, the electronic device 201 may perform additional user authentication, based on user's skin tone information. For example, a reaction of the human body to each wavelength may be different owing to its melanin component existing within the skin. As an example, the electronic device 201 may measure rates of measurement components corresponding to infrared ray, red light, green light and blue light, depending on person (1740, 1742, 1744, 1746 and 1748). According to this, the processor 220 may analyze rates of several wavelengths reflected from an external object making contact with the display device 250, to authenticate a user.

Figure 18:
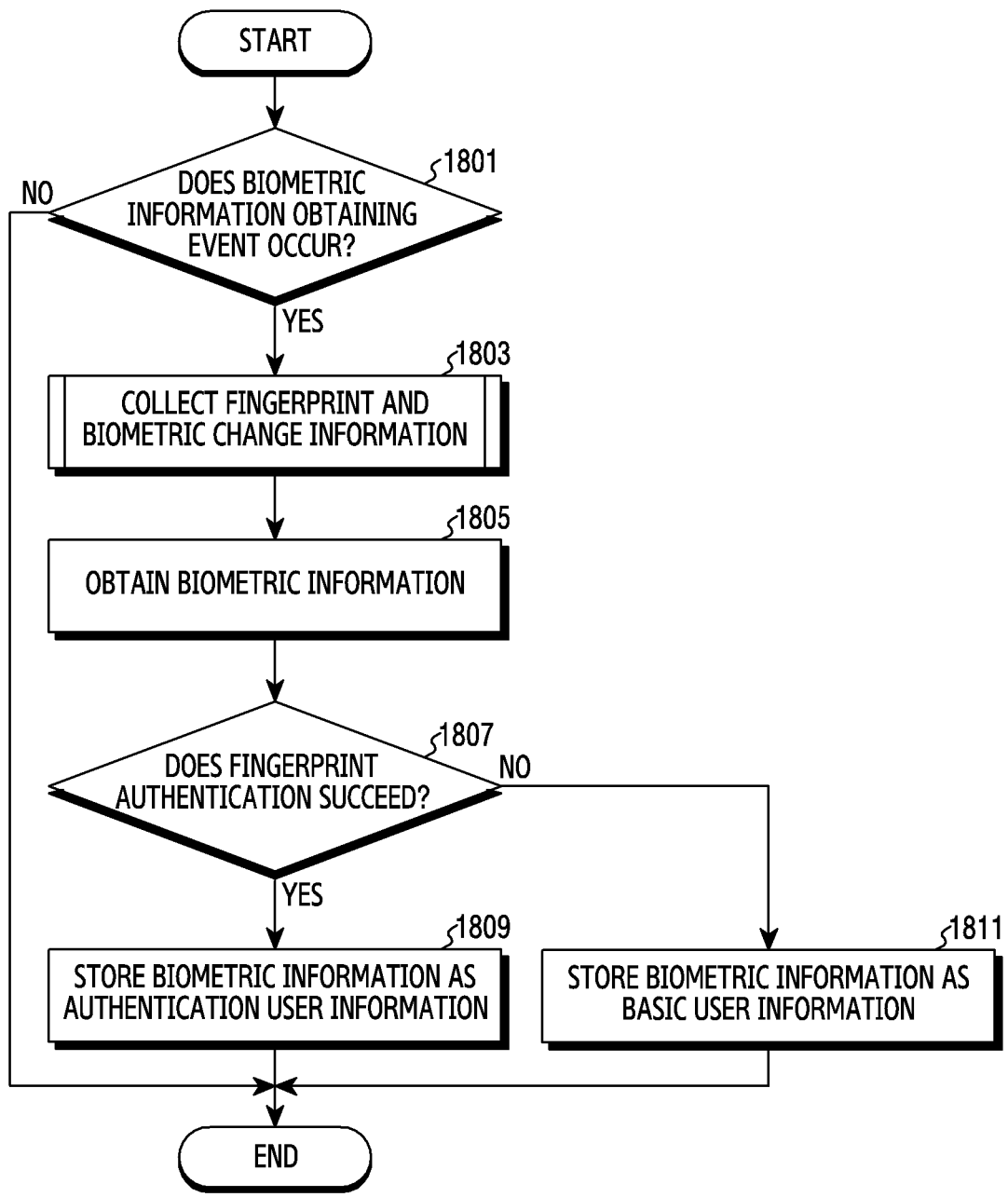
FIG. 18 is a flowchart illustrating a method for storing biometric information, based on user authentication information in an electronic device according to various embodiments of the disclosure.

FIG. 18 is a flowchart illustrating a method for storing biometric information, based on user authentication information in an electronic device according to various embodiments of the disclosure. In the following description, the electronic device may include the electronic device 201 of FIG. 2 or at least a part (e.g., the processor 220) of the electronic device 201.

Referring to FIG. 18, in operation 1801, the electronic device (e.g., the electronic device 201 of FIG. 2) may identify (determine) whether a biometric information obtaining event takes place. For example, the processor 220 may identify (determine) whether a heartbeat measurement menu is selected, based on a user input received through the input output interface 240.

In operation 1803, in response to the biometric information obtaining event taking place, the electronic device may obtain fingerprint and biometric change information about an external object making contact with a display device (e.g., the display device 250). For example, as in operation 501 to operation 507 of FIG. 5, the processor 220 may output light of a mutually different wavelength through a mutually different pixel set, to obtain fingerprint image and biometric change information.

In operation 1805, the electronic device may identify (determine) whether it may obtain biometric information of a user, based on the biometric change information. For example, the processor 220 may quantize an AC component (PPG) dependent on a blood flow rate of the human body in a time domain, to obtain a heart rate of the user. For example, the processor 220 may obtain oxygen saturation information of the user, based on a difference of reflectance rates of oxyhemoglobin and hemoglobin.

In operation 1807, the electronic device may identify (determine) whether user authentication using fingerprint information has succeeded. For example, in operation 1807, the processor 220 may compare a fingerprint image obtained based on light output through a first pixel set and a reference fingerprint image stored in the memory 230. In response to the fingerprint image and the reference fingerprint image being consistent with each other, the processor 220 may identify (determine) that the user authentication has succeeded. As an example, in response to a similarity between the fingerprint image and the reference fingerprint image exceeding a reference similarity, the processor 220 may identify (determine) that the fingerprint image and the reference fingerprint image are consistent with each other.

In operation 1809, in response to succeeding in the user authentication, the electronic device may classify and store the biometric information as information of the authenticated user. For example, in response to authenticating the user using fingerprint information, the processor 220 may identify (determine) that the biometric information obtained together with the fingerprint information is biometric information of the corresponding user. In operation 1809, the processor 220 may control the memory 230 to store the biometric information obtained in operation 1805, as the biometric information of the user who has succeeded in authentication by the fingerprint information. As an example, the processor 220 may control the communication module 260 to transmit the biometric information of the user to a health management server of the user who has succeeded in the authentication as well.

In operation 1811, in response to failing in the user authentication in operation 1807, the electronic device may classify and store the biometric information as basic user information. For example, in response to failing to authenticate the user using the fingerprint information, the processor 220 may identify that the biometric information obtained together with the fingerprint information is not the biometric information of the user of the electronic device 201. The processor 220 may control the memory 230 to classify and store the biometric information obtained in operation 1805, as common information.

According to an embodiment, in response to failing in the user authentication using the fingerprint information, the electronic device 201 may discard the biometric information obtained together with the fingerprint information.

According to various example embodiments of the disclosure, method of operating an electronic device may include identifying first biometric information and second biometric information from among a plurality of biometric information, and outputting light of first properties through a first pixel set corresponding to the first biometric information among a first sub pixel, a second sub pixel, and a third sub pixel in a display device including one or more pixels including the first sub pixel capable of outputting light of a first wavelength range, the second sub pixel capable of outputting light of a second wavelength range, and the third sub pixel capable of outputting light of a third wavelength range, and obtaining the first biometric information using light reflected from the external object, and outputting light of second properties through a second pixel set corresponding to the second biometric information among the first sub pixel, the second sub pixel, and the third sub pixel, and obtaining the second biometric information using light reflected from the external object.

According to various example embodiments, the first pixel set and the second pixel set may output light at mutually different timings.

According to various example embodiments, outputting the light of the first properties may include outputting light of the first pixel set through at least one pixel included in a first region of the display device, and outputting the light of the second properties may include outputting light of the second pixel set through at least one pixel included in a second region of the display device.

According to various example embodiments, at least a part of the one or more pixels included in the display device may further include a light emitting unit for irradiating light of an infrared band, and the first pixel set may include at least one of the first sub pixel, the second sub pixel, the third sub pixel, and the light emitting unit, and the second pixel set may include at least one different from that of the first pixel set among the first sub pixel, the second sub pixel, the third sub pixel, and the light emitting unit.

According to various example embodiments, the method may further include determining authentication on the external object, based on a similarity between designated first information and the first biometric information and a similarity between designated second information and the second biometric information.

According to various example embodiments, determining the authentication on the external object may include determining an association between the external object and a user, based on the second biometric information.

According to various embodiments, determining the authentication on the external object may include determining the authentication on the external object, based on a similarity of a change pattern of the second biometric information and a change pattern included in the designated second information.

According to various example embodiments, obtaining the first biometric information may include collecting the light of the first properties reflected from the external object, and obtaining a fingerprint image of the external object, based on the collected light.

According to various example embodiments, the first pixel set and the second pixel set may output light of mutually different wavelength ranges.

An electronic device and an operation method thereof according to various example embodiments may output light through at least one sub pixel among a plurality of sub pixels of a pixel included in a display, to obtain biometric information, thereby obtaining biometric information for user authentication.

An electronic device and an operation method thereof according to various example embodiments may output light at mutually different timings using a first pixel set and a second pixel set among a plurality of sub pixels of a pixel included in a display, to obtain each biometric information, thereby obtaining various biometric information for user authentication.

An electronic device and an operation method thereof according to various example embodiments may output light of a first pixel set through a first region in a human body contact region, and output light of a second pixel set through a second region, to obtain each biometric information, thereby obtaining various biometric information for user authentication.

An electronic device and an operation method thereof according to various example embodiments may output light through mutually different pixel sets among a plurality of sub pixels of a pixel included in a display, to additionally obtain another biometric information at the time of obtaining a fingerprint image, thereby strengthening a security of fingerprint authentication.

Figure 19:
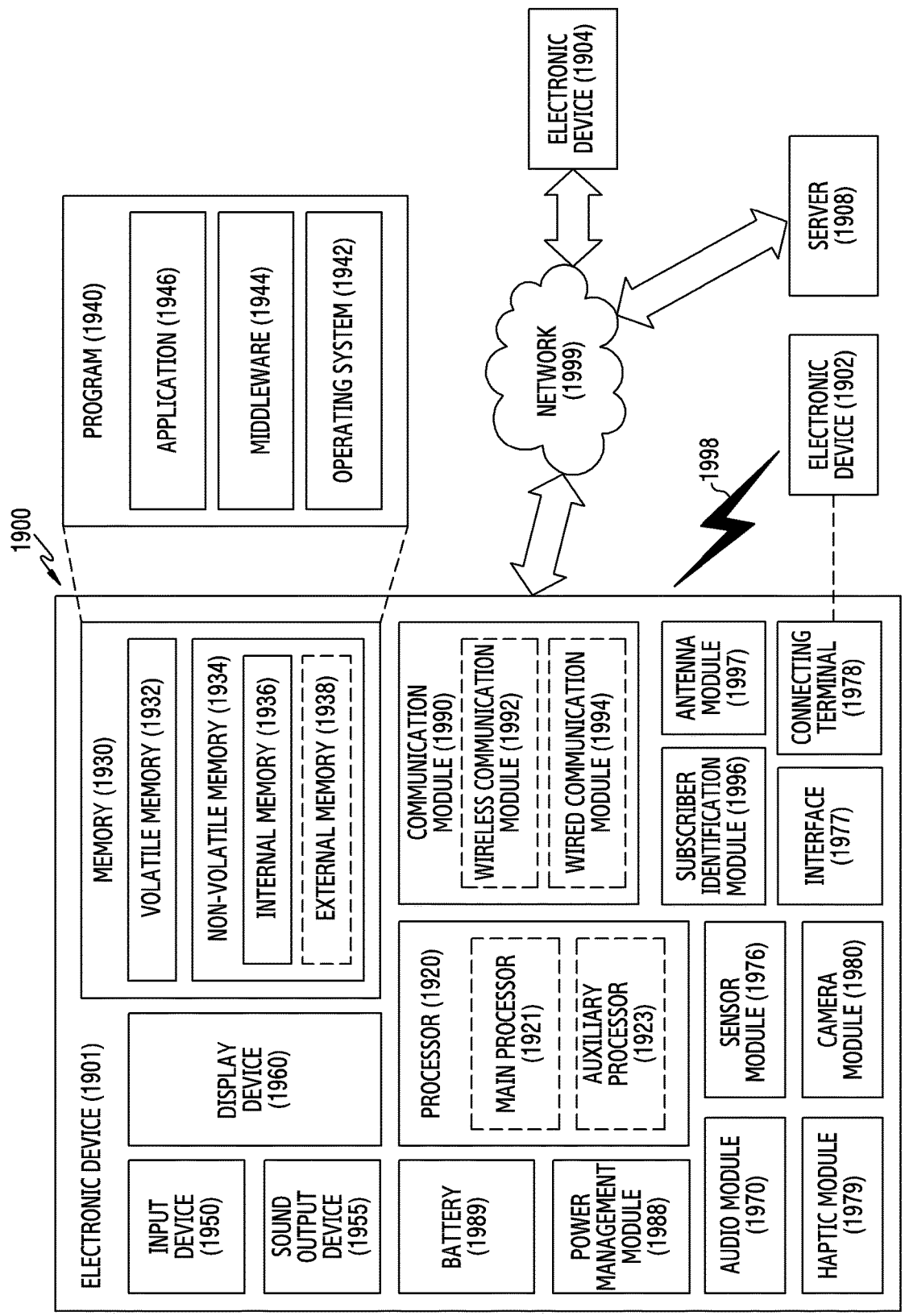
FIG. 19 is a block diagram illustrating an electronic device within a network environment for obtaining biometric information using a light source corresponding to the biometric information according to various embodiments of the disclosure.

FIG. 19 is a block diagram illustrating an electronic device 1901 in a network environment 1900 according to various embodiments.

Referring to FIG. 19, the electronic device 1901 in the network environment 1900 may communicate with an electronic device 1902 via a first network 1998 (e.g., a short-range wireless communication network), or an electronic device 1904 and/or a server 1908 via a second network 1999 (e.g., a long-range wireless communication network). According to an embodiment, the electronic device 1901 may communicate with the electronic device 1904 via the server 1908. According to an embodiment, the electronic device 1901 may include a processor (e.g., including processing circuitry) 1920 (e.g., processor 220 of FIG. 2), memory 1930 (e.g., memory 230 of FIG. 2), an input device (e.g., including input circuitry) 1950, a sound output device (e.g., including sound output circuitry) 1955, a display device 1960 (e.g., display device 250 of FIG. 2), an audio module (e.g., including audio output circuitry) 1970, a sensor module 1976, an interface (e.g., including interface circuitry) 1977, a haptic module (e.g., including haptic circuitry) 1979, a camera module 1980, a power management module 1988, a battery 1989, a communication module (e.g., including communication circuitry) 1990 (e.g., communication module 260 of FIG. 2), a subscriber identification module (SIM) 1996, and/or an antenna module 1997. In some embodiments, at least one (e.g., the display device 1960 or the camera module 1980) of the components may be omitted from the electronic device 1901, or one or more other components may be added in the electronic device 1901. In some embodiments, some of the components may be implemented as single integrated circuitry. For example, the sensor module 1976 (e.g., a fingerprint sensor, an iris sensor, or an illuminance sensor) may be implemented as embedded in the display device 1960 (e.g., a display).

The processor 1920 may include various processing circuitry and execute, for example, software (e.g., a program 1940) to control at least one other component (e.g., a hardware or software component) of the electronic device 1901 coupled with the processor 1920, and may perform various data processing or computation. According to one embodiment, as at least part of the data processing or computation, the processor 1920 may load a command or data received from another component (e.g., the sensor module 1976 or the communication module 1990) in volatile memory 1932, process the command or the data stored in the volatile memory 1932, and store resulting data in non-volatile memory 1934. According to an embodiment, the processor 1920 may include a main processor 1921 (e.g., without limitation, a dedicated processor, a central processing unit (CPU) and/or an application processor (AP), or the like), and an auxiliary processor 1923 (e.g., without limitation, a graphics processing unit (GPU), an image signal processor (ISP), a sensor hub processor, and/or a communication processor (CP), or the like) that is operable independently from, or in conjunction with, the main processor 1921. Additionally or alternatively, the auxiliary processor 1923 may be adapted to consume less power than the main processor 1921, or to be specific to a specified function. The auxiliary processor 1923 may be implemented as separate from, or as part of the main processor 1921.

The auxiliary processor 1923 may control at least some of functions or states related to at least one component (e.g., the display device 1960, the sensor module 1976, or the communication module 1990) among the components of the electronic device 1901, instead of the main processor 1921 while the main processor 1921 is in an inactive (e.g., sleep) state, or together with the main processor 1921 while the main processor 1921 is in an active state (e.g., executing an application). According to an embodiment, the auxiliary processor 1923 (e.g., an image signal processor or a communication processor) may be implemented as part of another component (e.g., the camera module 1980 or the communication module 1990) functionally related to the auxiliary processor 1923.

The memory 1930 may store various data used by at least one component (e.g., the processor 1920 or the sensor module 1976) of the electronic device 1901. The various data may include, for example, software (e.g., the program 1940) and input data or output data for a command related thereto. The memory 1930 may include the volatile memory 1932 or the non-volatile memory 1934.

The program 1940 may be stored in the memory 1930 as software, and may include, for example, an operating system (OS) 1942, middleware 1944, and/or an application 1946, or the like.

The input device 1950 may receive a command or data to be used by other component (e.g., the processor 1920) of the electronic device 1901, from the outside (e.g., a user) of the electronic device 1901. The input device 1950 may include various input circuitry, such as, for example, and without limitation, a microphone, a mouse, and/or a keyboard, or the like.

The sound output device 1955 may output sound signals to the outside of the electronic device 1901. The sound output device 1955 may include various sound output circuitry, such as, for example, and without limitation, a speaker and/or a receiver, or the like. The speaker may be used for general purposes, such as playing multimedia or playing record, and the receiver may be used for an incoming calls. According to an embodiment, the receiver may be implemented as separate from, or as part of the speaker.

The display device 1960 may visually provide information to the outside (e.g., a user) of the electronic device 1901. The display device 1960 may include, for example, and without limitation, a display, a hologram device, and/or a projector, or the like, and control circuitry to control a corresponding one of the display, hologram device, and projector. According to an embodiment, the display device 1960 may include touch circuitry adapted to detect a touch, or sensor circuitry (e.g., a pressure sensor) adapted to measure the intensity of force incurred by the touch.

The audio module 1970 may include various audio circuitry and convert a sound into an electrical signal and vice versa. According to an embodiment, the audio module 1970 may obtain the sound via the input device 1950, or output the sound via the sound output device 1955 or a headphone of an external electronic device (e.g., an electronic device 1902) directly (e.g., via wire) or wirelessly coupled with the electronic device 1901.

The sensor module 1976 may detect an operational state (e.g., power or temperature) of the electronic device 1901 or an environmental state (e.g., a state of a user) external to the electronic device 1901, and then generate an electrical signal or data value corresponding to the detected state. According to an embodiment, the sensor module 1976 may include, for example, and without limitation, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, and/or an illuminance sensor, or the like.

The interface 1977 may support one or more specified protocols to be used for the electronic device 1901 to be coupled with the external electronic device (e.g., the electronic device 1902) directly (e.g., via wire) or wirelessly. According to an embodiment, the interface 1977 may include, various interface circuitry, such as, for example, and without limitation, a high definition multimedia interface (HDMI), a universal serial bus (USB) interface, a secure digital (SD) card interface, and/or an audio interface, or the like.

A connecting terminal 1978 may include a connector via which the electronic device 1901 may be physically connected with the external electronic device (e.g., the electronic device 1902). According to an embodiment, the connecting terminal 1978 may include, for example, and without limitation, a HDMI connector, a USB connector, a SD card connector, and/or an audio connector (e.g., a headphone connector), or the like.

The haptic module 1979 may convert an electrical signal into a mechanical stimulus (e.g., a vibration or a movement) or electrical stimulus which may be recognized by a user via his tactile sensation or kinesthetic sensation. According to an embodiment, the haptic module 1979 may include, various haptic circuitry, such as, for example, and without limitation, a motor, a piezoelectric element, and/or an electric stimulator, or the like.

The camera module 1980 may capture a still image or moving images. According to an embodiment, the camera module 1980 may include one or more lenses, image sensors, image signal processors, or flashes.

The power management module 1988 may manage power supplied to the electronic device 1901. According to one embodiment, the power management module 1988 may be implemented as at least part of, for example, a power management integrated circuit (PMIC).

The battery 1989 may supply power to at least one component of the electronic device 1901. According to an embodiment, the battery 1989 may include, for example, a primary cell which is not rechargeable, a secondary cell which is rechargeable, or a fuel cell.

The communication module 1990 may support establishing a direct (e.g., wired) communication channel or a wireless communication channel between the electronic device 1901 and the external electronic device (e.g., the electronic device 1902, the electronic device 1904, or the server 1908) and performing communication via the established communication channel. The communication module 1990 may include one or more communication processors that are operable independently from the processor 1920 (e.g., the application processor (AP)) and supports a direct (e.g., wired) communication or a wireless communication. According to an embodiment, the communication module 1990 may include various modules including various communication circuitry, such as, for example, and without limitation, a wireless communication module 1992 (e.g., a cellular communication module, a short-range wireless communication module, or a global navigation satellite system (GNSS) communication module) and/or a wired communication module 1994 (e.g., a local area network (LAN) communication module and/or a power line communication (PLC) module), or the like. A corresponding one of these communication modules may communicate with the external electronic device via the first network 1998 (e.g., a short-range communication network, such as Bluetooth™, wireless-fidelity (Wi-Fi) direct, or infrared data association (IrDA)) or the second network 1999 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1992 may identify and authenticate the electronic device 1901 in a communication network, such as the first network 1998 or the second network 1999, using subscriber information (e.g., international mobile subscriber identity (IMSI)) stored in the subscriber identification module 1996.

The antenna module 1997 may transmit or receive a signal or power to or from the outside (e.g., the external electronic device) of the electronic device 1901. According to an embodiment, the antenna module 1997 may include one or more antennas, and, therefrom, at least one antenna appropriate for a communication scheme used in the communication network, such as the first network 1998 or the second network 1999, may be selected, for example, by the communication module 1990 (e.g., the wireless communication module 1992). The signal or the power may then be transmitted and/or received between the communication module 1990 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1901 and the external electronic device 1904 via the server 1908 coupled with the second network 1999. Each of the electronic devices 1902 and 1904 may be a device of a same type as, or a different type, from the electronic device 1901. According to an embodiment, all or some of operations to be executed at the electronic device 1901 may be executed at one or more of the external electronic devices 1902, 1904, or 1908. For example, if the electronic device 1901 should perform a function or a service automatically, or in response to a request from a user or another device, the electronic device 1901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1901. The electronic device 1901 may provide the outcome, with or without further processing of the outcome, as at least part of a reply to the request. To that end, a cloud computing, distributed computing, or client-server computing technology may be used, for example.

The electronic device according to various example embodiments may be one of various types of electronic devices. The electronic devices may include, for example, and without limitation, a portable communication device (e.g., a smart phone), a computer device, a portable multimedia device, a portable medical device, a camera, a wearable device, and/or a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it refers to a situation in which the element may be coupled with the other element directly (e.g., via wire), wirelessly, or via a third element.

As used herein, the term "module" may include a unit or component implemented in hardware, software, and/or firmware, or any combinations thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of, for example, and without limitation, a dedicated processor, a CPU, an application-specific integrated circuit (ASIC), or the like.

Various embodiments as set forth herein may be implemented as software (e.g., the program 1940) including one or more instructions that are stored in a storage medium (e.g., internal memory 1936 or external memory 1938) that is readable by a machine (e.g., the electronic device 1901). For example, a processor (e.g., the processor 1920) of the machine (e.g., the electronic device 1901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, and/or a relay server, or the like.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, thereof, it will be understood that the various example embodiments are intended to be illustrative, and not limiting. It will be further understood that various changes, alternatives and modifications may be made to the various example embodiments without departing from the true spirit and full scope of the disclosure.

What is claimed is:

1. An electronic device comprising:
   a display device comprising one or more pixels, the one or more pixels comprising a first sub pixel configured to output light having a first wavelength range, a second sub pixel configured to output light having a second wavelength range, and a third sub pixel configured to output light having a third wavelength range;
   one or more sensors configured to obtain biometric information about an external object; and
   a processor,
   wherein the processor is configured to cause the electronic device to:
   in response to an input on the display device by the external object, identify first biometric information and second biometric information from among the biometric information, wherein the second biometric information is a different type of biometric information from the first biometric information;
   output first light having first properties through a first pixel set corresponding to the first biometric information among the first sub pixel, the second sub pixel, and the third sub pixel, the first pixel set determined from a plurality of pixels based on a position of the input on the display device, and obtain the first biometric information, using the one or more sensors, based on second light reflected from the external object;
   output third light having second properties through a second pixel set corresponding to the second biometric information among the first sub pixel, the second sub pixel, and the third sub pixel, the second pixel set determined from the plurality of pixels based on the position of the input on the display device, and obtain the second biometric information using the one or more sensors, based on fourth light reflected from the external object; and
   determine authentication of the external object based on the obtained first biometric information and the obtained second biometric information.

2. The electronic device of claim 1, wherein the first light and the third light are output at mutually different timings.

3. The electronic device of claim 1, wherein the processor is configured to cause the electronic device to output the first light of the first pixel set through at least one pixel in a first region of the display device, and to output the third light of the second pixel set through at least one pixel in a second region of the display device.

4. The electronic device of claim 1, wherein at least a part of the one or more pixels included in the display device further comprises a light emitting unit comprising light emitting circuitry configured to irradiate light having an infrared band,
   the first pixel set comprises at least one of the first sub pixel, the second sub pixel, the third sub pixel, and the light emitting unit, and
   the second pixel set comprises at least one different from that of the first pixel set among the first sub pixel, the second sub pixel, the third sub pixel, and the light emitting unit.

5. The electronic device of claim 1, wherein the processor is configured to cause the electronic device to determine the authentication of the external object, based on a similarity between designated first information and the first biometric information and a similarity between designated second information and the second biometric information.

6. The electronic device of claim 5, wherein the processor is configured to cause the electronic device to identify an association between the external object and a user, based on the second biometric information.

7. The electronic device of claim 5, wherein the processor is configured to cause the electronic device to determine the authentication of the external object, based on a change pattern of the second biometric information.

8. The electronic device of claim 1, wherein the one or more sensors are disposed in a partial region of the display device, and/or are disposed in a rear surface of the display device.

9. The electronic device of claim 8, wherein the one or more sensors further comprise a light converting member comprising light converting circuitry configured to filter light of a predefined wavelength range.

10. The electronic device of claim 1, wherein the first biometric information includes a fingerprint image of the external object obtained based on the second light reflected from the external object.

11. The electronic device of claim 1, wherein the first light and the third light have mutually different wavelength ranges.

12. A method of operating an electronic device, the method comprising:
   in response to an input on a display device of the electronic device by an external object, identifying first biometric information and second biometric information among a plurality of biometric information, wherein the second biometric information is a different type of biometric information from the first biometric information;
   outputting first light having first properties through a first pixel set corresponding to the first biometric information among a first sub pixel, a second sub pixel, and a third sub pixel in the display device comprising one or more pixels comprising the first sub pixel configured to output light having a first wavelength range, the second sub pixel configured to output light having a second wavelength range, and the third sub pixel configured to output light having a third wavelength range, the first pixel set determined from a plurality of pixels based on a position of the input on the display device, and obtaining the first biometric information using second light reflected from the external object;

outputting third light having second properties through a second pixel set corresponding to the second biometric information among the first sub pixel, the second sub pixel, and the third sub pixel, the second pixel set determined from the plurality of pixels based on the position of the input on the display device, and obtaining the second biometric information using fourth light reflected from the external object; and determining authentication of the external object based on the obtained first biometric information and the obtained second biometric information.

13. The method of claim 12, wherein the first light and the third light are output at mutually different timings.

14. The method of claim 12, wherein outputting the first light having the first properties comprises outputting the first light of the first pixel set through at least one pixel in a first region of the display device, and wherein outputting the second light having the second properties comprises outputting the second light of the second pixel set through at least one pixel in a second region of the display device.

15. The method of claim 12, wherein at least a part of the one or more pixels included in the display device further comprises a light emitting unit comprising light emitting circuitry configured to irradiate light of an infrared band, the first pixel set comprises at least one of the first sub pixel, the second sub pixel, the third sub pixel, and the light emitting unit, and the second pixel set comprises at least one different from that of the first pixel set among the first sub pixel, the second sub pixel, the third sub pixel, and the light emitting unit.

16. The method of claim 12, wherein determining the authentication of the external object comprises determining the authentication of the external object, based on a similarity between the designated first information and the first biometric information and a similarity between designated second information and the second biometric information.

17. The method of claim 16, wherein determining the authentication of the external object comprises identifying an association between the external object and a user, based on the second biometric information.

18. The method of claim 16, wherein determining the authentication of the external object comprises determining the authentication of the external object, based on a similarity of a change pattern of the second biometric information and a change pattern of the designated second information.

19. The method of claim 12, wherein obtaining the first biometric information comprises:

collecting the second light reflected from the external object; and obtaining a fingerprint image of the external object, based on the collected second light.

20. The method of claim 12, wherein the first light and the third light have mutually different wavelength ranges.

* * * * *